(12) United States Patent
Keyaki et al.

(10) Patent No.: US 7,878,085 B2
(45) Date of Patent: Feb. 1, 2011

(54) CONFIGURATION OF LUBRICATING SYSTEM FOR A POWER UNIT OF A VEHICLE

(75) Inventors: Shinichiro Keyaki, Saitama (JP); Toru Nishi, Saitama (JP); Eiichi Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 862 days.

(21) Appl. No.: 11/805,289

(22) Filed: May 22, 2007

(65) Prior Publication Data

US 2007/0272195 A1 Nov. 29, 2007

(30) Foreign Application Priority Data

May 26, 2006 (JP) .............................. 2006-146732

(51) Int. Cl.
*F16H 57/02* (2006.01)
*F16H 57/04* (2006.01)
*F16H 61/00* (2006.01)
*F16H 59/00* (2006.01)
*F16H 63/00* (2006.01)

(52) U.S. Cl. .................... 74/337.5; 74/606 R
(58) Field of Classification Search ................ 74/337.5, 74/606 R
See application file for complete search history.

(56) References Cited

U.S. PATENT DOCUMENTS

| | | | | |
|---|---|---|---|---|
| 2,265,805 | A | * 12/1941 | Evans | 123/196 A |
| 4,860,862 | A | * 8/1989 | Yater et al. | 192/18 A |
| 6,332,444 | B1 | * 12/2001 | Narita et al. | 123/196 R |
| 7,694,597 | B2 | * 4/2010 | Nishi et al. | 74/325 |

FOREIGN PATENT DOCUMENTS

| | | | |
|---|---|---|---|
| JP | 58-195012 U | | 12/1983 |
| JP | 10-119591 | | 5/1998 |
| JP | 2001280457 A | * | 10/2001 |
| JP | 2002-227939 | | 8/2002 |
| JP | 2003-239715 | | 8/2003 |
| JP | 2003-306191 A | | 10/2003 |
| JP | 2004-036633 A | | 2/2004 |

* cited by examiner

*Primary Examiner*—Tisha D Lewis
(74) *Attorney, Agent, or Firm*—Carrier Blackman & Associates, P.C.; William D. Blackman; Joseph P. Carrier

(57) ABSTRACT

A power unit includes a shaft member rotatably supported by the crankcase and a torsional coil spring, disposed at one end of the shaft member, biasing a swing arm in one rotational direction. An oil strainer is fixed to the crankcase through a strainer support bracket extending vertically relative to a strainer element. The torsional coil spring includes a coil portion wound around the shaft member, one end portion retained on the side of the shaft member, and the other end portion retained by a retaining portion formed integrally with the strainer support bracket.

14 Claims, 12 Drawing Sheets

CONFIGURATION OF LUBRICATING SYSTEM FOR A POWER UNIT OF A VEHICLE

CROSS-REFERENCE TO RELATED APPLICATIONS

The present application claims priority under 35 USC §119 based on Japanese patent application No. 2006-146732, filed on May 26, 2006. The entire subject matter of this priority document is herein incorporated by reference.

BACKGROUND OF THE INVENTION

1. Field of the Invention

The present invention relates to a vehicle power unit configured to an internal combustion engine and a transmission device for transmitting rotation of an engine crankshaft to the wheels of the vehicle. More particularly, the present invention relates to a configuration of a lubricating system provided within the power unit.

2. Description of the Background Art

For stable operation of a power unit, which includes a transmission device which transmits the rotational driving power of the internal combustion engine to vehicle wheels, a vehicle is equipped with various types of auxiliary machinery including a lubricating system which feeds lubricating oil to the lubricating portions of shafts and gears of the engine. Such a power unit is shown, for example, in Japanese Patent Laid-open No. Hei 10-119591. The lubricating system generally includes an oil strainer installed in an oil storage portion disposed in a housing, and a feed pump for discharging the lubricating oil from the oil storage portion via the oil strainer.

According to Japanese Patent Laid-open No. Hei 10-119591, an oil strainer is attached to a lower portion of a crankcase, and the oil storage portion is formed in the lower portion of the crankcase. The crankcase is divided into two case-half bodies. One case-half body of the crankcase includes a recess formed therein adapted to receive the strainer therein. When the other case-half body of the crankcase is joined to the one case-half body, both the case-half bodies sandwich the strainer therebetween.

Further, according to Japanese Patent Laid-open No. Hei 10-119591, a power transmission device can establish a plurality of forward stages, a neutral stage and a reverse stage. Establishment of these speed change stages is achieved in response to a rotational position of a shift drum. The power transmission device includes a turn restricting mechanism which restricts the turn of the shift drum. The turn-restricting mechanism has a torsional coil spring and is provided to prevent the establishment of the reverse stage during forward travel of the vehicle. The inner wall surface of the housing is formed with a specifically dimensioned, to-be-engaged groove to retain an end of the torsional coil spring of the turn-restricting mechanism.

However, according to Japanese Patent Laid-open No. Hei 10-119591, in order to attach strainer to the power unit, it is necessary to join the other case-half body to the one case-half body with the strainer received in the recess of the one case-half body. Such attachment structure has the possibility that the strainer received in the recess of the one case-half body of the crankcase drops or becomes misaligned when the other case-half body is joined to the one case-half body. An increased dimensional accuracy is required in order to join the other case-half body to the one case-half body while preventing the drop (or misalignment) of the strainer. This may lead to a reduction in manufacturability of the power unit.

Moreover, to retain the torsional coil spring of the turn-restricting mechanism, the internal wall surface of the housing needs to be formed in a dedicated and/or properly dimensioned shape. This complicates the forming operation of the housing for disposing the power transmission device, which may lead to a reduction in manufacturability of the power unit.

In consideration of the above described problems, it is an object of the present invention to provide a power unit that improves the attachment performance of an oil strainer and enhances productivity of an internal combustion engine.

SUMMARY OF THE INVENTION

In order to attain the above object, a power unit according to the present invention is configured to include: a crankcase formed at a lower portion thereof with an oil storage portion for collecting lubricating oil therein, and an oil strainer provided in the oil storage portion and having a planer, a substantially flat plate strainer element. The power unit includes a shaft member (inhibitor shaft) rotatable supported by the crankcase; and a biasing torsional coil spring disposed at one side of a rotational-axial direction of the shaft member. The oil strainer is fixed to the crankcase through a strainer support bracket extending vertically relative to the strainer element and the torsional coil spring includes a coil portion wound around the shaft member, one end portion retained on the side of the shaft member, and the other end portion retained by a retaining portion formed integrally with the strainer support bracket.

The power unit includes a turn-restricting mechanism having the shaft member, the torsional coil spring disposed at one side of a rotational-axial direction of the shaft member and a swing arm which is attached to the shaft member. The turn restricting mechanism restricts, in a predetermined manner, the turning member disposed above the oil strainer. The turning member may be a circular member having a groove portion extending in a circumferential direction at an outer circumferential surface thereof, and a stopper portion formed within the groove portion which projects radially outwardly. A rotation of the turning member is restricted by abutting a leading end of the swing arm against the stopper portion when the turning member is turned.

Preferably, the retaining portion of the strainer bracket is formed in the shape of a flat plate, and the other end portion of the torsional coil spring is formed to bend and linearly extend and is arranged along the retaining portion. The power transmission device (power unit) includes a speed change mechanism which can establish a plurality of forward stages, a neutral stage and a reverse stage. The speed change mechanism includes the shift drum, serving as the turning member, which is housed inside the crankcase and changes a speed change stage established in response to a rotational position thereof, and the turn-restricting mechanism which is configured to restrict turn of the shift drum to restrict establishment of a predetermine speed change stage when the leading end of the swing arm is located inside the groove portion of the shift drum.

According to the present invention, a cover member may be attached to cover an outer surface of the crankcase, and the strainer support bracket is fixed to the outer surface of the crankcase and covered by the cover member.

According to the power unit of the present invention as described above, the strainer is fixed to the inside of the housing through the support bracket, and one end portion of the torsional coil spring is retained by the retaining portion formed integrally with the support bracket. Thus, the oil strainer and the torsional coil spring can be easily attached to the housing and the shape of the housing is not complicated, thereby enhancing manufacturability of the power unit.

The other end portion of the torsional coil spring is configured to bend and linearly extend. According to the present invention, one end portion of the torsional coil spring is constantly retained by the retaining portion of the support bracket, therefore, even if the torsional coil spring rotates resulting from the rotation of the swing arm. In addition, even if the retaining portion is formed in the shape of a flat plate, the torsional coil spring can be retained by the retaining portion. Therefore, assembly of the oil strainer in the power unit can be simplified, thereby further enhancing manufacturability.

Since the turn-restricting mechanism can restrict the rotation of the shift drum, it can be made to function as an inhibitor which restricts the establishment of a predetermined speed change stage. In order to reduce the size of the torsional coil spring and the swing arm of the turn-restricting mechanism, it is desired to dispose the shift drum in the vicinity of the oil storage portion. The shift drum may be defined as a member, which is used to change establishment of a speed change stage and does not directly perform power transmission in the power transmission device. Therefore, even if being met with the stirring resistance of the lubricating oil, the shift drum has no influence on power transmission efficiency. In this way, the turn-restricting mechanism, functioning as an inhibitor which restricts the establishment of a predetermined speed change stage, can be reduced in size without impairing power transmission efficiency.

The strainer support bracket is fixed to the outer surface of the crankcase and the cover member is attached to cover the outer surface of the crankcase. Thus, in the assembled state, the oil strainer is protected by the cover member and is easily detached and replaced with another by removing the cover member.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE ILLUSTRATIVE EMBODIMENTS

A few selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. Arrows U and F in the figures denote upside and front, respectively.

Figure 1:
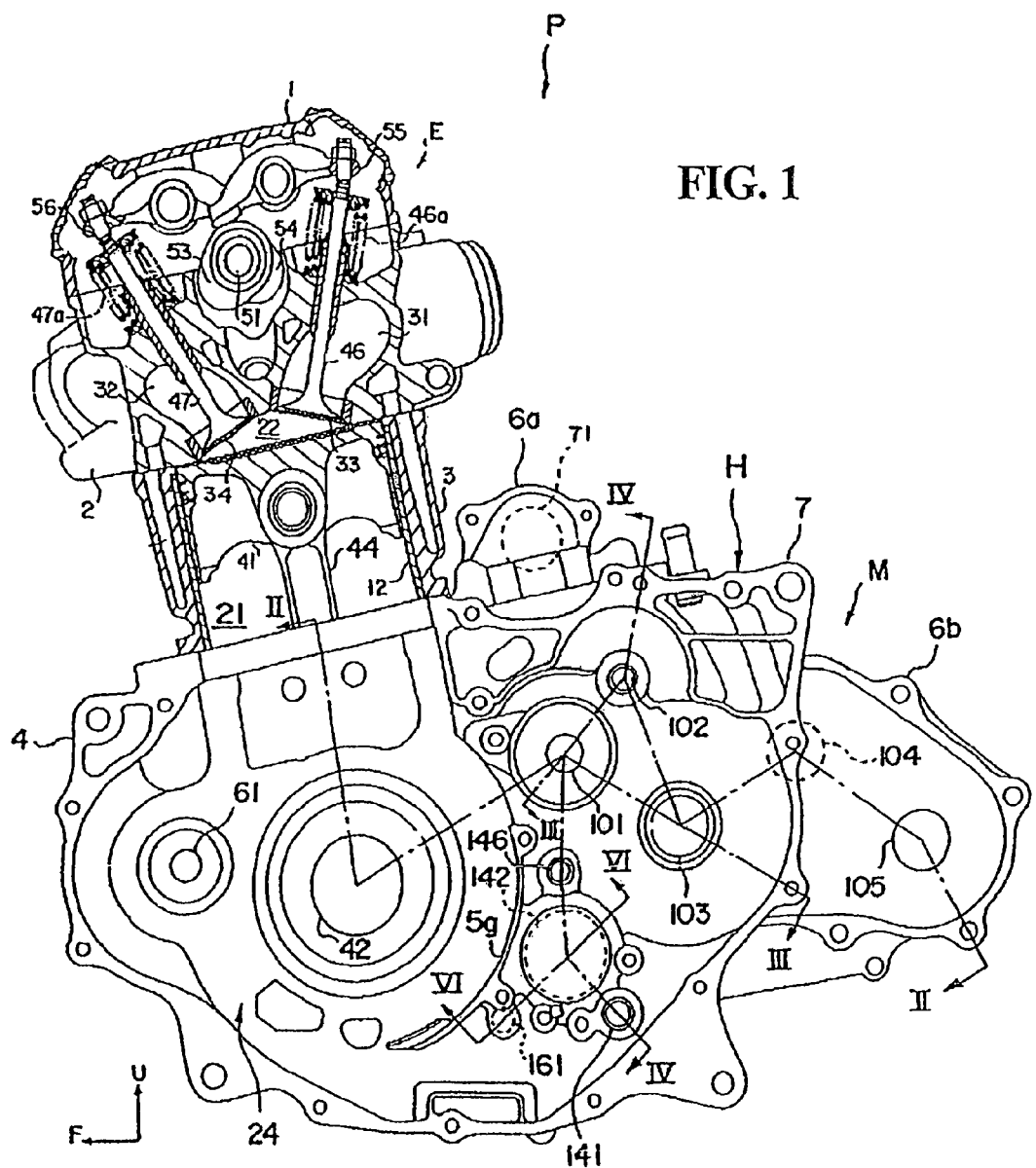
FIG. 1 is a left side sectional view of a power unit provided with the lubricating system for a vehicle according to the present invention, showing an internal combustion engine at a front side of the power unit, and a transmission disposed within the power unit housing at a rear side of the engine.

FIG. 1 is a left-hand cross-sectional view of a power unit P of a saddle-ride type vehicle provided with a lubricating device according to the present invention. Examples of the saddle-ride type vehicles include buggy vehicles for running on an irregular terrain. The power unit P is composed of a single cylinder-four stroke engine E and a power transmission device M which transmits rotational driving force of the engine E to rear wheels (not shown).

Figure 2:
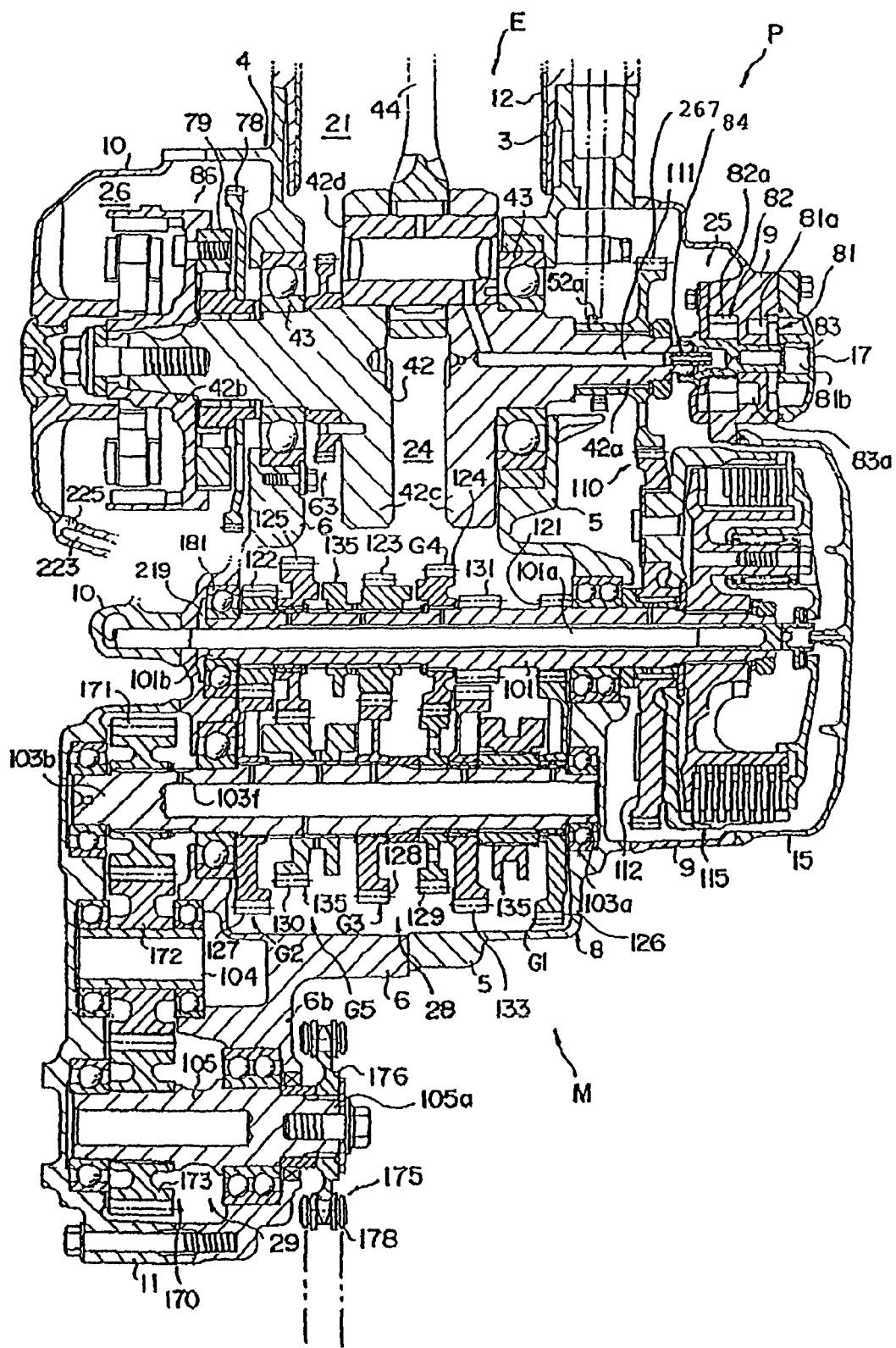
FIG. 2 is a sectional view of the power unit of FIG. 1 taken along line II-II of FIG. 1 and viewed in the direction of the line arrows.

Referring to FIGS. 1 and 2, the engine E is configured to include a crankcase 4, a cylinder block 3, a cylinder head 2 and a head cover 1. The crankcase 4 rotatably supports a crankshaft 42 by the left and right sides thereof. The crankshaft 42 is housed within an internal space, i.e., a crank chamber 24 of the crankcase 4. The cylinder block 3 is connected to the crankcase 4 at upper portion thereof to internally form a cylinder bore 21 in which a piston 41 is axially slidably inserted. The cylinder head 2 is connected to the cylinder block 3 so as to cover the cylinder bore 21 at upper portion thereof. The head cover 1 is attached to the cylinder head 2 so as to cover it from above. The cylinder bore 21 is formed so as to be surrounded by the internal circumferential surface of a sleeve 12 fitted inside the cylinder block 3. The crank chamber 24 houses therein left and right crank webs 42c, 42c of the crankshaft 42 and a crank pin 42d. The cylinder bore 21 communicates with the crank chamber 24. The piston 41 is connected to the crankshaft 42 through a connecting rod 44.

A combustion chamber 22 is defined by the cylinder head 2, the sleeve 12 and the piston 41. The combustion chamber 22 communicates with an intake port 31 and an exhaust port 32 formed inside the cylinder head 2, through an intake opening 33 and an exhaust opening 34, respectively. An intake valve 46 and an exhaust valve 47 attached to the cylinder head 2 are biased in directions of closing the intake and exhaust valves 46 and 47 by valve springs 46a and 47a, respectively. A cam shaft 51 provided on its outer circumferential face with cams 53, 54 is rotatably supported on a split face between the head cover 1 and the cylinder head 2. Rocker arms 55, 56 are swingably provided inside the head cover 1 in such a manner that one ends of the rocker arms 55 and 56 are abutted against the cams 53 and 54, respectively, of the cam shaft 51 and the other ends of the rocker arms 55 and 56 are abutted against the upper ends of the intake and exhaust valves 46 and 47, respectively. Rotation of the crankshaft 42 is transmitted to the cam shaft 51 through chain transmission. When the cam shaft 51 is rotated, the rocker arms 55 and 56 are swung at predetermined timings through the action of the cams 53 and 54, respectively. Thus, the intake and exhaust valves 46 and 47 are moved downward against the biasing force of the valve springs 46a and 47a to thereby open the intake and exhaust openings 33 and 34, respectively.

An intake pipe (not shown) communicating with the outside the engine (the intake pipe may be open to the atmosphere) is connected to the intake port 31. A throttle valve (not shown) for adjusting an intake air volume, an injector for injecting fuel and an air cleaner for purifying outside air are attached to the intake pipe. When the piston 41 moves downward, the air purified by the air cleaner is mixed with fuel injected by the injector. The air-fuel mixture of the amount according to the opening angle of the throttle valve is fed to the combustion chamber 22 from the intake port 31 via the intake opening 33. The air-fuel mixture is compressed as the piston 41 moves upward and then ignited for combustion by an ignition plug (not shown), attached to the cylinder head 2, which again moves the piston 41 downward. When the piston 41 again moves upward, the gas after the combustion is discharged to the outside the engine through the exhaust opening 34, the exhaust port 32 and an exhaust pipe (not shown) connected to the exhaust port 32. While the series of strokes of intake, compression, combustion and exhaust are repeated, the piston 41 is reciprocated to rotate the crankshaft 42.

The crankcase 4 is split into a right-half section and a left-half section, namely, a right case 5 and a left case 6, which are connected to each other. A right cover 9 is attached to cover part of the right side surface of the right case 5. A left cover 10 is attached to cover the front portion of the left side surface of the left case 6.

A right end portion 42a of the crankshaft 42 is received in the inside (a right auxiliary machinery chamber 25) of the right cover 9. A cam drive sprocket 52a and a primary drive gear 111 of the power transmission device M, which constitutes a chain transmission mechanism for transmitting power to the cam shaft 51, are connected to the right end portion 42a of the crankshaft 42. A drive shaft 83 of an oil pump (a feed pump 81 and a scavenging pump 82) is coupled to the right end of the crankshaft 42. A left end portion 42b of the crankshaft 42 is received in the inside (a left auxiliary machinery chamber 26) of the left cover 10. A generator 86 is provided on the left end portion 42b. In addition, a starter driven gear 78 adapted to start the crankshaft 42 via a one way clutch 79 is connected to the left end portion 42b. The rotational drive force of a starter motor 71 is transmitted to the starter driven gear 78. The starter motor 71 is attached to a motor attachment bracket 6a integrally extending upward from the left case 6. As shown in FIG. 1, a balancer shaft 61 is rotatably received in the crank chamber 24. The balancer shaft 61 is located forward of the crankshaft 42 and functions as a primary balancer shaft. A balancer drive gear 63a is provided on the crankshaft 42 so as to be in contact with the left crank web 42c. The balancer drive gear 63a constitutes a gear train 63 adapted to rotate the balancer shaft 61 simultaneously with the crankshaft 42.

As shown in FIGS. 1 to 4, the power transmission device M is provided inside of the transmission chamber 28. The power transmission device extends outside of the transmission case 8 formed integrally with the rear portion of the crankcase 4. The power transmission device M includes a main shaft 101, a reverse idle shaft 102, a counter shaft 103, a final idle shaft 104 and an output shaft 105, all of which are provided parallel to the crankshaft 42; a primary gear train 110; a speed change mechanism 120; a final gear train 170; and a chain drive mechanism 175. The primary gear train 110 is provided between the crankshaft 42 and the main shaft 101. The speed change mechanism 120 includes a plurality of speed change gear trains G1 to G5 disposed between the main shaft 101 and the counter shaft 103. The final gear train 170 is disposed between the counter shaft 103 and the output shaft 105. The chain drive mechanism 175 is disposed between the output shaft 105 and the rear wheels.

As shown in FIG. 1, the five shafts 101, 102, 103, 104, 105 are arranged from the front in order of the reference numerals and located on the upside of the crankshaft 42. Specifically, the main shaft 101 is disposed rearward and upward of the crankshaft 42. The counter shaft 103 is disposed rearward downward of the main shaft 101. The reverse idle shaft 102 is located above and between the main shaft 101 and the counter shaft 103 in the back and forth direction. The counter shaft 103 and the output shaft 105 are juxtaposed in the back and forth direction so that a line connecting their shaft centers extends almost horizontally. The final idle shaft 104 is disposed above and between the shafts 103 and 105 in the back and forth direction.

Figure 3:
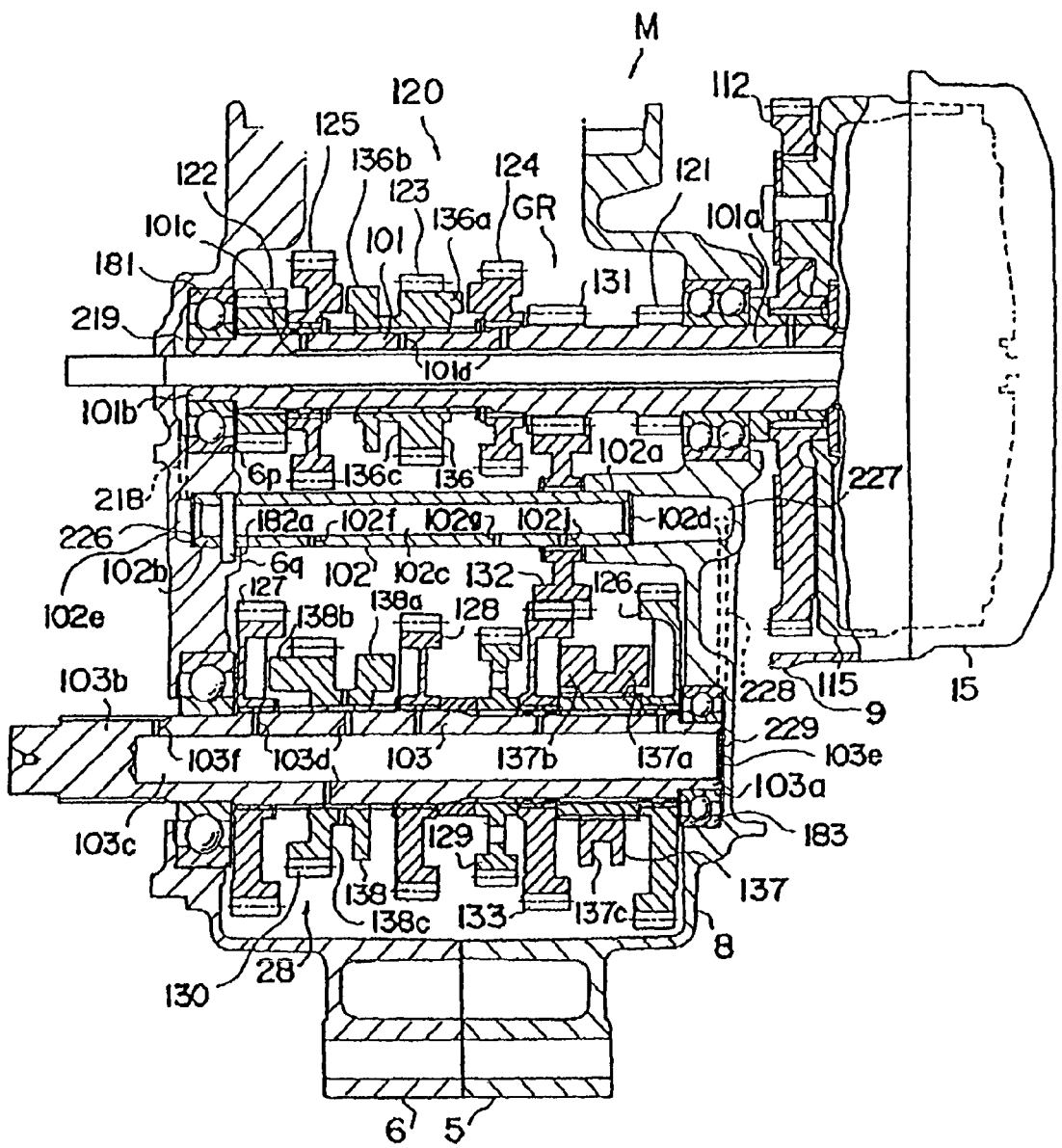
FIG. 3 is a sectional view of the power unit of FIG. 1 taken along line III-III of FIG. 1 and viewed in the direction of the line arrows.

As shown in FIG. 3, the main shaft 101, the reverse idle shaft 102 and the counter shaft 103 are supported at both ends thereof by the transmission case 8 (that is, the right case 5 and the left case 6) so as to be housed in the transmission chamber 28. It may be noted that, the main shaft 101 and the counter shaft 103 are rotatably supported whereas the reverse idle shaft 102 is fixeldly supported by the transmission case 8.

As shown in FIG. 2, the right end portion 101a of the main shaft 101 is received in the right auxiliary machinery chamber 25. The primary gear train 110 includes the primary drive gear 111, and a primary driven gear 112 provided at the right end portion 101a of the main shaft 101 so as to be rotatable with respect thereto and meshing with the primary drive gear 111. A clutch mechanism 115 is provided at the right end of the main shaft 101. The clutch mechanism 115 is configured to operate the primary driven gear 112 to be engaged with and disengaged from the main shaft 101. The right cover 9 has an opening portion which otherwise covers the clutch mechanism 115. A clutch cover 15 is attached to cover the opening portion (see FIG. 11).

The speed change mechanism includes speed change gear trains having first, second, third, fourth and fifth gear trains G1, G2, G3, G4, G5 for setting a forward stage as shown in FIG. 2, and a reverse gear train GR for setting a reverse stage as shown in FIG. 3. The forward stage gear trains G1, G2, G3, G4, G5, are disposed between the main shaft 101 and the counter shaft 103. The reverse gear train GR is disposed between the main shaft 101 and the counter shaft 103 via the reverse idle shaft 102. Each of the gear trains G1, G2, G3, G4, G5 and GR has gear ratio set to differ from each other and one of gears constituting each gear train is provided to be rotatable with respect to the corresponding shaft.

Figure 4:
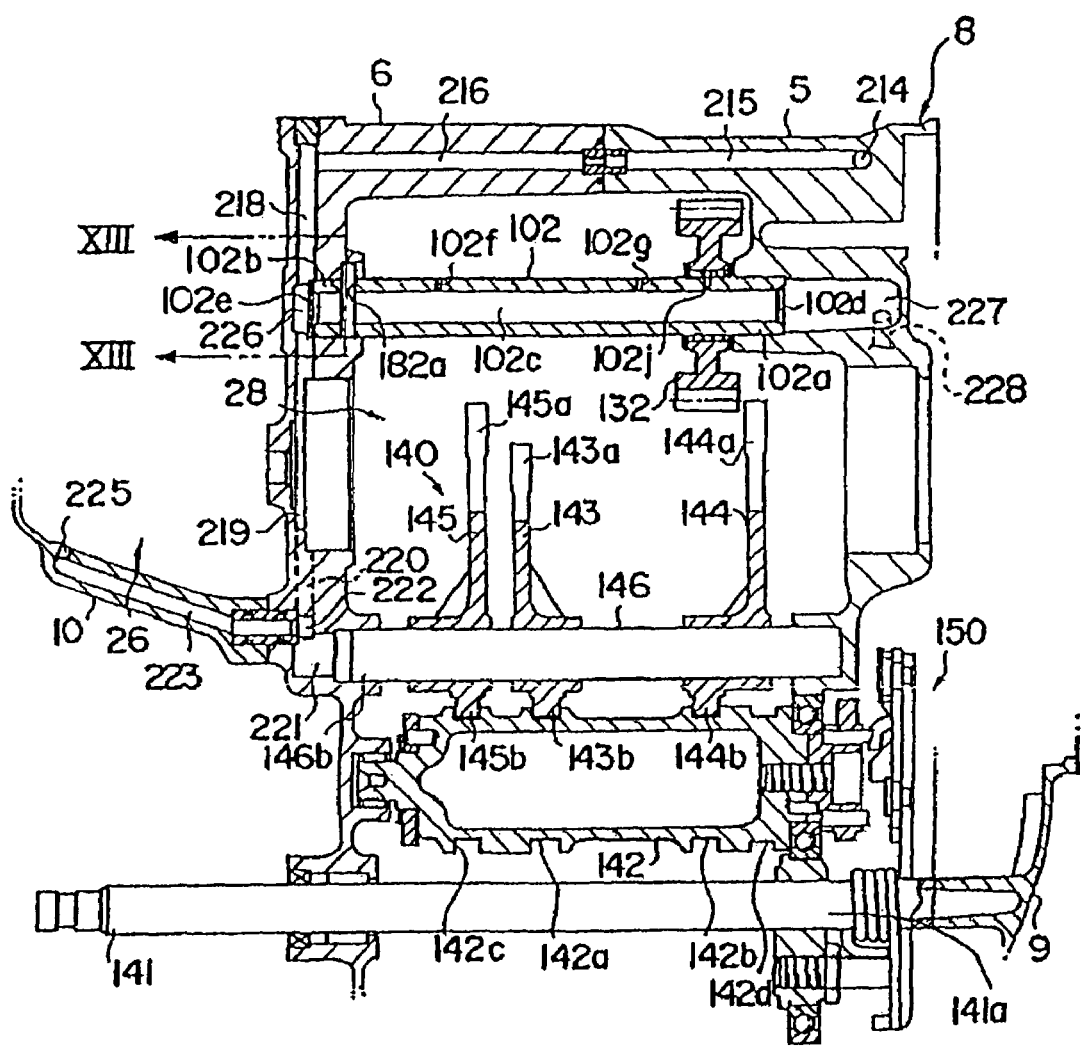
FIG. 4 is a sectional view of the power unit of FIG. 1 taken along line IV-IV of FIG. 1 and viewed in the direction of the line arrows.

The speed change mechanism 120 as shown in FIGS. 2-4, is a constantly gear-meshing type speed change mechanism which can select five forward speeds and one reverse speed. The speed change mechanism includes six speed change gear trains G1, G2, G3, G4, G5 and GR, a dog clutch mechanism 135 and a shift change mechanism 140. The speed change mechanism 120 is housed within the transmission chamber 28. The speed change mechanism 120 is configured as below.

The shift change mechanism 140 is operated by an operator to responsively operate the dog clutch mechanism 135. Thus, one of the speed change gear trains G1, G2, G3, G4, G5, GR, is rotated simultaneously with the main shaft 101 and the counter shaft 103. In this way, the rotational speed of the main shaft 101 is changed according to the gear ratio of a specific gear train rotated integrally with the shafts 101, 103 and the changed rotation is transmitted to the counter shaft 103.

Referring to FIGS. 1 and 2, a gear bracket 6b is formed integrally with the rear portion of the left case 6 so as to project rearward. A gear case 11 is attached to cover the rear portion of the left side surface of the left case 6 and the left side surface of the gear bracket 6b. The left end portion 103b of the counter shaft 103 projects from the left case 6 and is received in a final gear chamber 29 formed inside the gear case 11. The final idle shaft 104 and the output shaft 105 are disposed in the final gear chamber 29. The final idle shaft 104 and the output shaft 105 have their respective right ends supported by the gear bracket 6b and respective left ends supported by the gear case 11.

The final gear train 170 includes a final drive gear 171, a final idle gear 172 and a final driven gear 173. The final drive gear 171 is provided at the left end portion 103b of the counter shaft 103. The final idle gear 172 is provided on the final idle shaft 104 so as to mesh with the final drive gear 171. The final driven gear 173 is provided on the output shaft 105 so as to mesh with the final idle gear 172. As shown in FIG. 2, the right end portion 105a of the output shaft 105 projects rightward of the gear bracket 6b to be exposed to the outside of the transmission case 8. The chain drive mechanism 175 includes a drive sprocket 176 joined to the right end portion 105a of the output shaft 105; a driven sprocket (not shown) connected to the rear wheel; and a drive chain 178 wound between both the sprockets. The chain drive mechanism 175 is disposed rearward of the transmission case 8.

With such configuration of a power transmission device M, rotation of the crankshaft 42 is transmitted to the main shaft 101 via the primary gear train 110 and the main clutch 115. The rotation of the main shaft 101 is transmitted to the counter shaft 103 via any one of the speed change gear trains G1, G2, G3, G4, G5, GR. The rotation of the counter shaft 103 is transmitted to the output shaft 105 via the final gear train 170. The rotation of the output shaft 105 is finally transmitted to the rear wheel via the chain drive mechanism 175.

The speed change mechanism 120 is described with reference to FIGS. 2 to 4. The first through fifth speed gear trains G1 through G5 are arranged in a specific order, from the right to left, i.e., form the first speed gear train G1 to the fourth speed gear train G4 to the third speed gear train G3 to the fifth speed gear train G5, and to the second speed gear train G2. The gear trains G1 through G5 include drive gears 121 through 125 carried on the main shaft 101. The driven gears 126 through 130 carried on the counter shaft 103, each of which meshes with a corresponding one of the drive gears 121 through 125. Among the gear trains G1 though G5, the drive gears 121 to 123 are carried on the main shaft 101 so as to be constantly rotatable integrally therewith and the driven gear 129, 130 are carried on the counter shaft 103 so as to be constantly rotatable integrally therewith. In addition, the drive gears 124, 125 are carried on the main shaft 101 so as to be rotatable with respect to each other and the driven gears 126, 127, 128 are carried on the counter shaft 103 so as to be rotatable with respect to each other.

As shown in FIG. 3, the reverse gear train GR is disposed between the first and the fourth speed gear train G1 and G4 in the leftward and rightward direction. The reverse gear train GR includes a reverse drive gear 131 integral with the main shaft 101; a reverse idle gear 132 carried on the reverse idle shaft 102 so as to mesh with the reverse drive gear 131 for relative rotation; and a reverse driven gear 133 carried on the counter shaft 103 so as to mesh with the reverse idle gear 132 for relative rotation.

The dog clutch mechanism 135 shown in FIGS. 2 and 3, includes a first shift sleeve 136, a second shift sleeve 137 and a third shift sleeve 138. The first shift sleeve 136 is formed integrally with the third speed drive gear 123 so as to be axially movable between the fourth and the fifth speed drive gear 124 and 125. The second shift sleeve 137 is rotatable integrally with the counter shaft 103 and axially movable between the first speed driven gear 126 and the reverse driven gear 133. The third shift sleeve 138 is formed integrally with the fifth speed driven gear 130 so as to be axially movable between the second and the third speed driven gears 127 and 128.

It may be noted that FIGS. 2 and 3 depict the state where the first, second and third shift sleeves 136, 137, and 138 are in their respective neutral positions. The shift sleeves 136, 137 and 138 are formed with dog tooth 136a, 137a and 138a, respectively, projecting rightward and with dog tooth 136b, 137b and 138b, respectively, projecting leftward. The fourth and the fifth speed drive gear 124, 125 (rotatable with respect to each other) adjacent to the shift sleeve 136 are formed on their faces opposed thereto with respective engagement holes adapted to engage with the corresponding dog tooth 136a, 136b. The driven gear 126, 129 (rotatable with respect to each other) adjacent to the shift sleeve 137 are formed on their faces opposed thereto with respective engagement holes adapted to engage with the corresponding dog tooth 137a, 137b. The second and the third speed gear 127, 128 (rotatable with respect to each other) adjacent to the shift sleeve 138 are formed on their faces opposed thereto with respective engagement holes adapted to engage with the corresponding dog tooth 138a, 138b. The shift sleeves 136, 137 and 138 are formed at their left-right central portions with fork grooves 136c, 137c and 138c adapted to engage with the leading ends 143a, 144a and 145a of the shift forks 143, 144 and 145, respectively, included in the shift change mechanism 140.

The shift change mechanism 140, as shown in FIGS. 1 and 4, includes a shift spindle 141 rotated in response to the operation of a shift pedal; a shift drum (a turning member) 142; first, second and third shift forks 143, 144 and 145; and a fork shaft 146 supporting the first, second and the third shift forks 143, 144, 145. The shift drum 142 is connected to the shift spindle 141 via an interlocking mechanism 150, and is rotated by a predetermined angle at a time along with the rotation of the shift spindle 141. The first, second and third shift forks 143, 144 and 145 are engaged with three cam grooves 142a, 142b and 142c, respectively, formed on the outer circumferential face of the shift drum 142.

The shift spindle 141, the shift drum 142 and the fork shaft 146 are each supported at both ends thereof by the transmission case 8 and disposed in the lower portion of the transmission chamber 28. The shift spindle 141 and the shift drum 142 are rotatably supported whereas the fork shaft 146 is fixedly supported in the transmission case 8. A right end 141a of the shift spindle 141 is received in the right auxiliary machinery chamber 25 and is connected to the interlocking mechanism 150. The shift fork 143 has a distal end 143a engaged with the fork groove 136c of the first shift sleeve 136 and a proximal end 143b engaged with the first cam groove 142a. The second shift fork 144 has an distal end 144a engaged with the fork groove 137c of the second shift sleeve 137 and a proximal end 144b engaged with the fork groove 137c of the second shift sleeve 137. The third shift fork 145 has a distal end 145a engaged with the fork groove 138c of the third shift fork 138 and a proximal end 145b engaged with the third cam groove 142c.

With the dog clutch mechanism 135 and the shift change mechanism 140 configured described above, the shift spindle 141 is rotated in response to the operation of the shift pedal and interlocking with the rotation of the shift drum 142 is rotated in a predetermined rotational direction by a predetermined angle at a time. Thus, the first, second and third shift fork 143, 144 and 145 is guided by the cam grooves 142a, 142b and 142c, respectively, to move in the axial direction of the fork shaft 146. Movement of each of the shift forks 143, 144 and 145 axially moves a corresponding one of the shift sleeves 136, 137 and 138 on a corresponding one of the main shaft 101 and the counter shaft 103. In this way, the speed change stage according to the shift pedal operation is set as discussed below.

When all of the first, second and third sleeves 136, 137 and 138 are placed at their respective neutral positions, a neutral stage is established in which power transmission from the main shaft 101 to the counter shaft 103 is interrupted. When the shift pedal is operated from this state to the upshift side, the shift drum 142 is rotated in a direction of arrow R1 at a predetermined angle to move the second shift sleeve 137 rightward. This causes the first speed driven gear 126 to be rotatable integrally with the countershaft 103, thereby establishing a first speed stage in which power transmission is executed through the first speed gear train G1. With repeat of the same operation, the third shift sleeve 138 is moved leftward to cause the second speed driven gear 127 to be rotatable integrally with the counter shaft 103, thereby establishing a second speed stage in which power transmission is executed through the second speed gear train G2. The third shift sleeve 138 is moved rightward to cause the third speed driven gear 128 to be rotatable integrally with the counter shaft 103, thereby establishing a third speed stage in which power transmission is executed through the third speed gear train G3. The first shift sleeve 136 is moved rightward to cause the fourth speed drive gear 124 to be rotatable integrally with the main shaft 101, thereby establishing a fourth speed stage in which power transmission is executed through the fourth speed gear train G4. The first shift sleeve 136 is moved leftward to cause the fifth speed drive gear 125 to be rotatable integrally with the main shaft 101, thereby establishing a fifth speed stage in which power transmission is executed through the fifth speed gear train G5.

Figure 6:
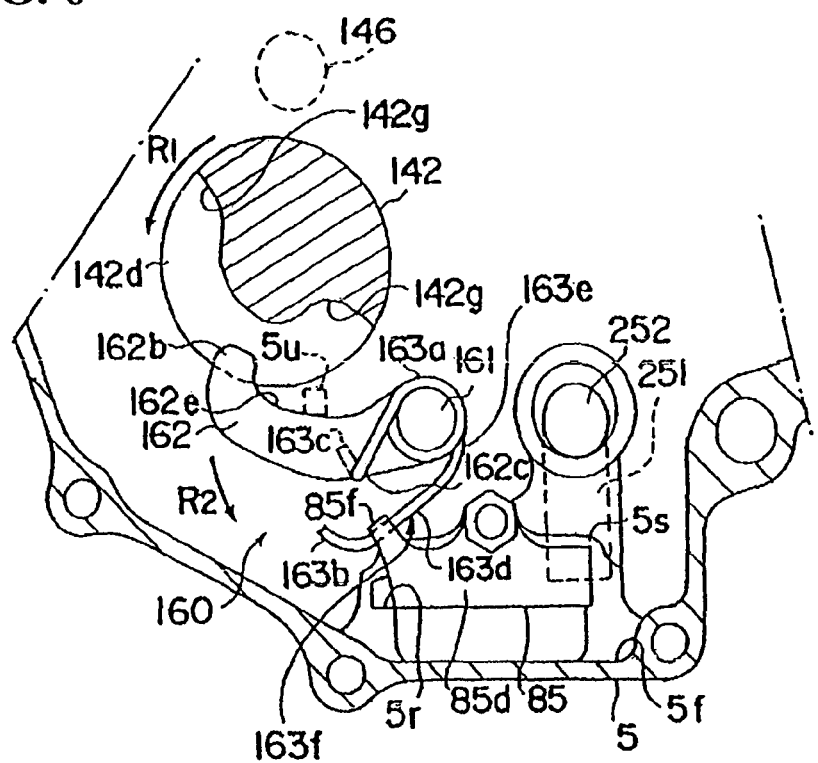
FIG. 6 is a side sectional view of a portion of the right case of the power unit of FIG. 1, showing a strainer and a reverse inhibitor mechanism.

When a reverse arm (not shown) attached to the handlebar of the vehicle is operated, an inhibitor mechanism 160 (also referred as a reverse inhibitor mechanism), shown in FIG. 6, is released. In addition, the desired operation of the shift pedal is then performed with the neutral stage established to rotate the shift drum 142 in a direction opposite to the rotational direction toward the upshift side mentioned above. This moves the second shift sleeve 137 rightward to cause the reverse driven gear 133 to be rotatable integrally with the counter shaft 103, thereby establishing a reverse stage in which power transmission is executed through the reverse gear train GR. It may be noted that in the establishment of the speed change stages, remaining sleeves are returned to or maintained in their respective neutral positions.

Figure 5:
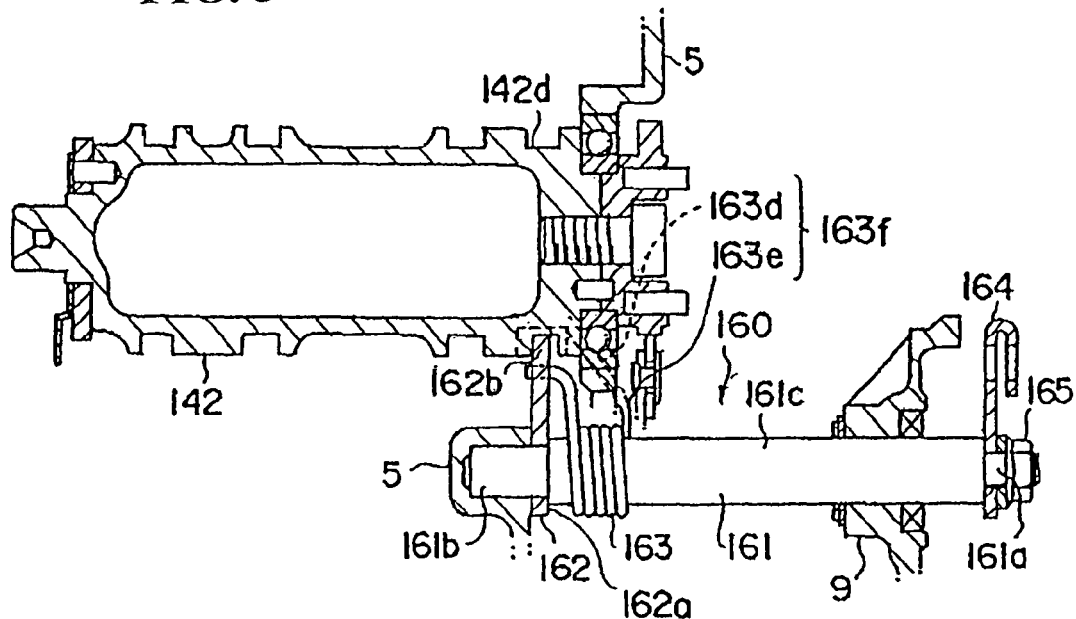
FIG. 5 is a sectional view of the power unit of FIG. 1 taken along line VI-VI of FIG. 1 and viewed in the direction of the line arrows.

As shown in FIGS. 5 and 6, the speed change mechanism 120 includes the reverse inhibitor mechanism 160 which restricts the rotational operation of the shift drum 142 of the shift change mechanism 140 in order to prevent the unintended establishment of the reverse stage. The reverse inhibitor mechanism 160 includes an inhibitor shaft (also referred as a shaft member) 161 rotatably attached to the crankcase; an inhibitor arm (also referred as a swing arm) 162 attached to the inhibitor shaft 161 so as to be rotatable integrally therewith and pivotally moved in response to the rotation of the inhibitor shaft 161; and a biasing torsional coil spring 163 (also referred as a biasing torsional coil spring) which applies biasing force to the inhibitor arm 162.

The shift drum 142 includes an inhibitor groove 142d extending in the circumferential direction. The inhibitor groove 142d is formed on outer circumferential face of the shift drum. A stopper 142g is formed in the inhibitor groove 142d so as to project radially outwardly. The inhibitor arm 162 is biased by the torsional coil spring 163 so that its leading end 162b is located inside the inhibitor groove 142d.

The inhibitor shaft 161 is a stepped shaft formed such that its right and left end sections 161a, 161b are larger in diameter than its central section 161c. The left end portion 161b of the inhibitor shaft 161 is inserted into a through-hole formed in the proximal end 162a of the inhibitor arm 162. The right end surface of the inhibitor arm 162 is abutted against and welded to the left end face of the central section 161c, so that the inhibitor arm 162 is rotatable integrally with the inhibitor shaft 161. The inhibitor shaft 161 has the central section 161c carried by the right cover 9, the left end section 161b carried by the right side surface of the right case 5, and the right end section 161a exposed to the outside of a housing H as discussed herein below.

A coil section 163a of the torsional coil spring 163 is wound around the central section 161c of the inhibitor shaft 161 received in the right auxiliary machinery chamber 25. One end portion 163b extending from the coil section 163a of the torsional coil spring 163 is retained between the right case 5 and an oil strainer 85 (also referred as a strainer). The other end portion 163c of the coil spring 163 extending from the coil section 163a is retained by a retaining groove 162c of the inhibitor arm 162. Both the end portions 163b, 163c are retained in this way, whereby a leading end 162b of the inhibitor arm 162 is biased against the inhibitor groove 142d. In this case, the inhibitor arm 162 is abutted against a stopper portion 5u projecting from the inner wall face of the right case (see FIG. 8). This restricts the pivotal movement of the inhibitor arm 162 resulting from the biasing force of the torsional coil spring 162. This restriction prevents the leading end 162b of the inhibitor arm 162 from being abutted against the shift drum, which permits the shift drum to rotate smoothly.

As shown in FIG. 5, the right end section 161a of the inhibitor shaft 161 is partially cut away and is formed at its end with external thread. A reverse change arm 164 is fitted onto the right end section 161a and then a nut 165 is threaded to the right end section 161a. The reverse change arm 164 fastened to the right end section 161a of the inhibitor shaft 161 is pivotally moved in conjunction with the operation of a reverse lever (not shown).

In the reverse inhibitor mechanism 160, the leading end 162b of the inhibitor arm 162 is located inside the inhibitor groove 142d such that when the reverse lever is not operated, the reverse change arm 164 is located at a normal position. For this reason, even if the shift drum 142 is rotated in a direction required for establishing the reverse stage, the leading end 162b of the inhibitor arm 162 is abutted against the stopper 142g formed inside the inhibitor groove 142d to restrict the rotation of the shift drum 142. When the reverse lever is operated, the reverse change arm 164 is pivotally moved. Since the reverse change arm 164 is fastened to the right end section 161a of the inhibitor shaft 161, the pivotal movement of the reverse change arm 164 reliably turns the inhibitor shaft 161. When the inhibitor shaft 161 is rotated in conjunction with the reverse change arm 164, the inhibitor arm 162 is pivotally moved in the direction of arrow R2 in FIG. 6 to withdraw the leading end 162b outside of the inhibitor groove 142d. This permits the shift drum 142 to rotate in the direction of establishing the reverse stage. Thereafter, when the operation of the reverse lever is released, the inhibitor arm 162 is pivotally moved to the position of restricting the rotation by the biasing force of the torsional coil spring 163. Thus, the inhibitor arm 162 is restored to the state of enabling to restrict the rotation of the shift drum 142.

The housing structure of the power unit P, with additional reference to FIGS. 7 through 11, is discussed below.

The housing H of the power unit P is configured to include the head cover 1, the cylinder head 2, the cylinder block 3, the right case 5, the left case 6, the right cover 9, the left cover 10 and the gear case 11. In addition, the housing H is configured to include the clutch cover 15, and a pump cover 17 attached at the right side of the right cover 9 to cover the opening portion of the right cover 9. The right case 5 and the left case 6 are joined together to integrally form the crankcase 4 and the transmission case 8 in the back and forth direction. The crankcase 4 and the transmission case 8 include front wall portions 5c, 6c and rear wall portions 5d, 6d extending substantially in a vertical direction, and upper wall portions 5e, 6e and lower wall portions 5f, 6f extending substantially in a longitudinal direction. The crankcase 4 and the transmission case 8 (the crank chamber 24 and the transmission chamber 28) are partitioned in the back and forth (longitudinal) direction by arcuate (having a substantially curved shape) central partition walls 5g, 6g (see FIGS. 8 and 9) disposed along the rotational trajectories of the crank webs 42c, 42c.

Figure 8:
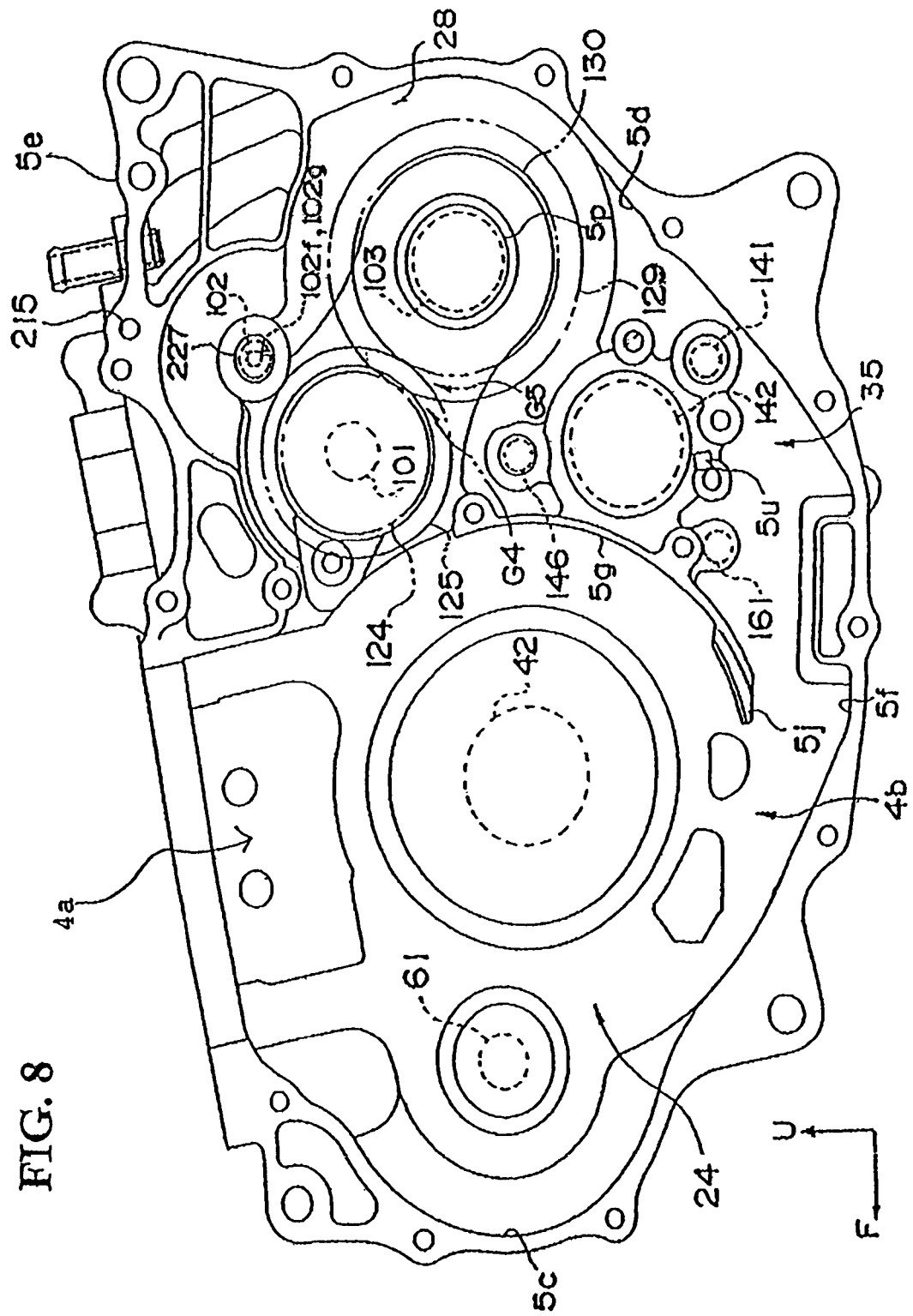
FIG. 8 is a left side view of the right case of the power unit of FIG. 1.
Figure 9:
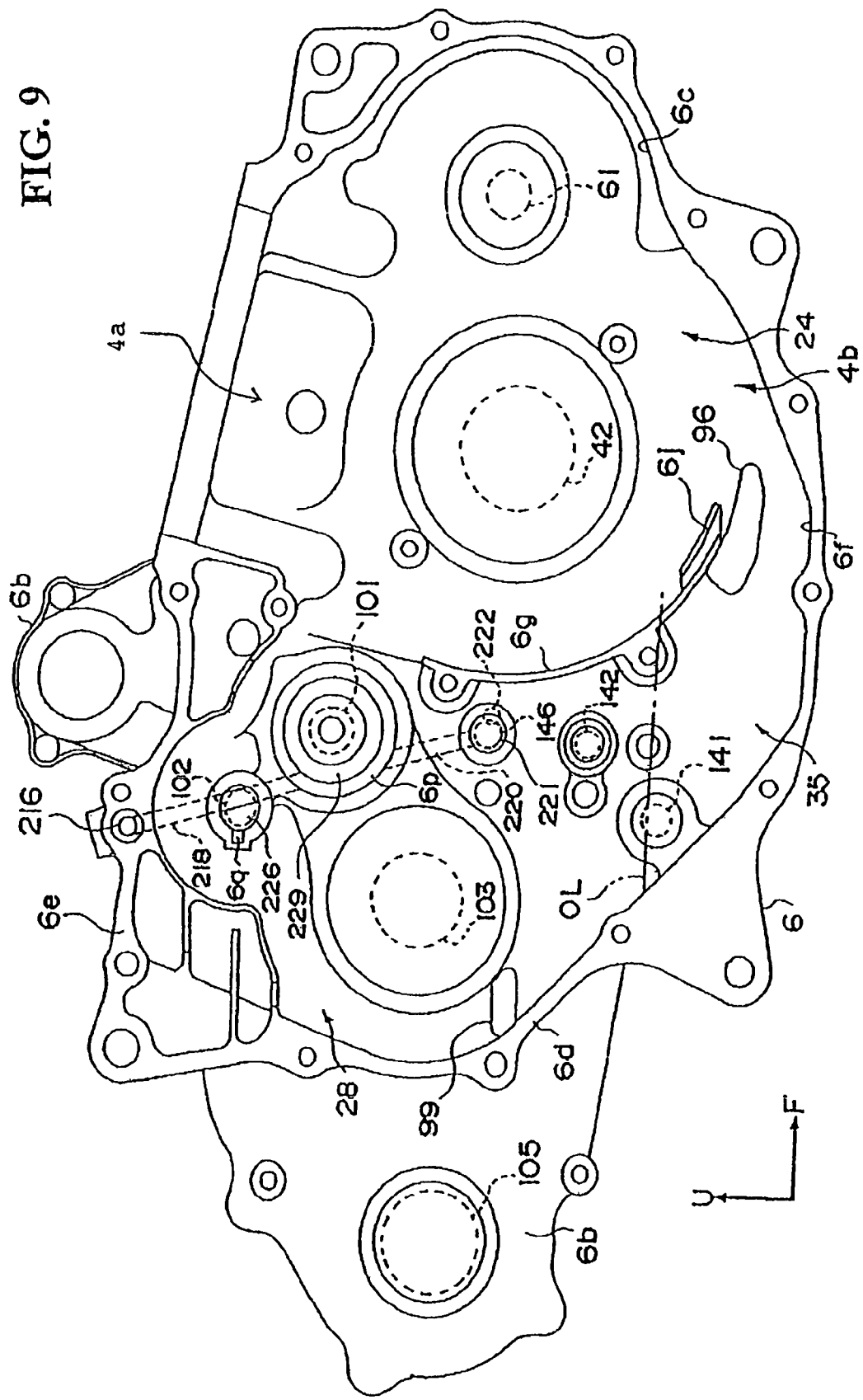
FIG. 9 is a right side view of a left case of the power unit of FIG. 1.

As shown in FIGS. 8 and 9, an oil storage chamber 35 is formed below the transmission chamber 28. During normal operation of the vehicle on horizontal surface, an oil level OL is maintained (encountered) in the oil storage chamber 35. The oil storage chamber 35 is surrounded by the lower portion of the rear wall portions 5d, 6d and the lower wall portions 5f, 6f to store lubricating oil therein. The oil storage chamber 35 communicates with the transmission chamber 28 in upward and downward direction, and also with the crank chamber 24 via a communication space 4b located forward and below the lower end of the central partition walls 5g, 6g.

Figure 7:
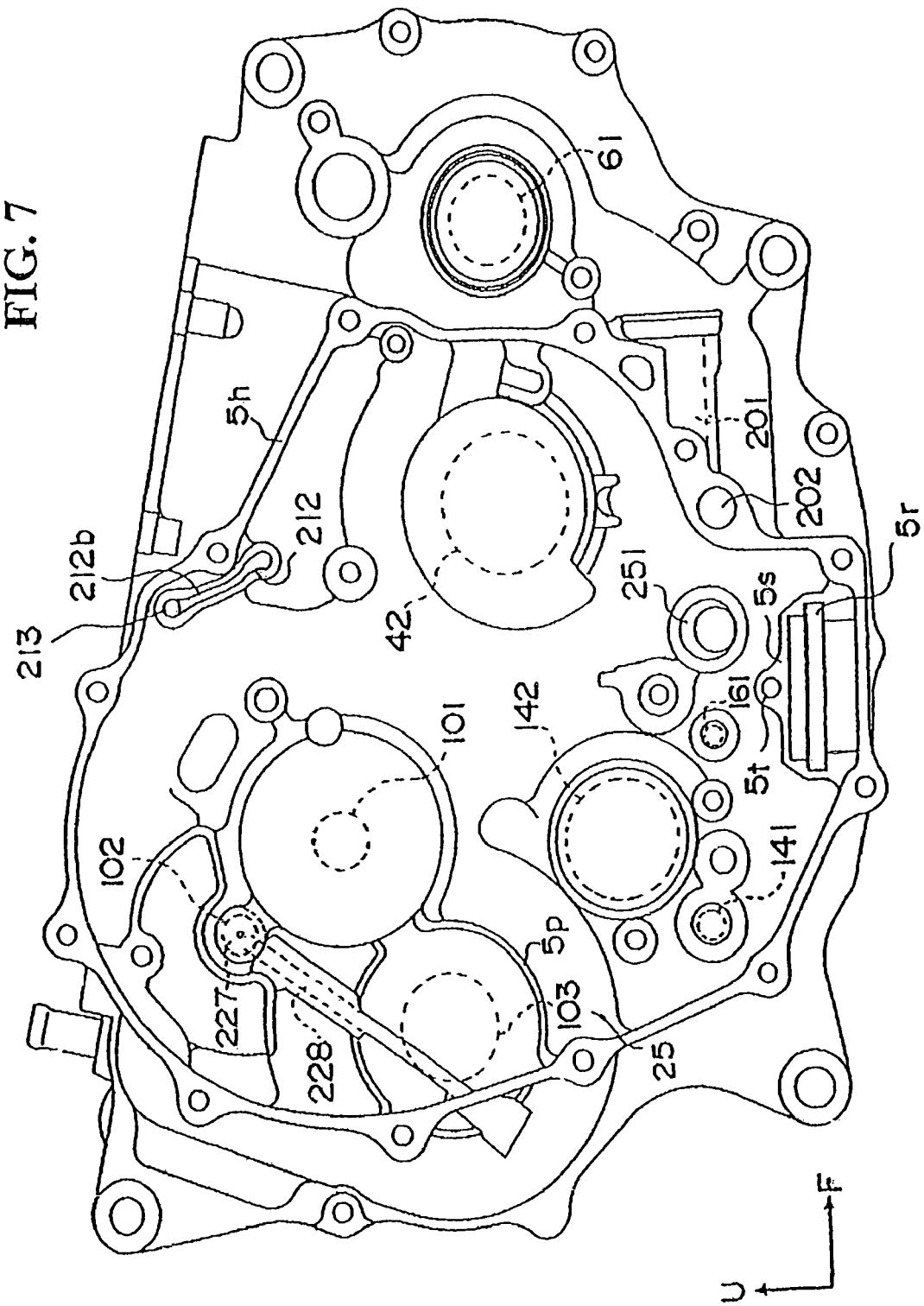
FIG. 7 is a right side view of the right case of the power unit of FIG. 1.
Figure 10:
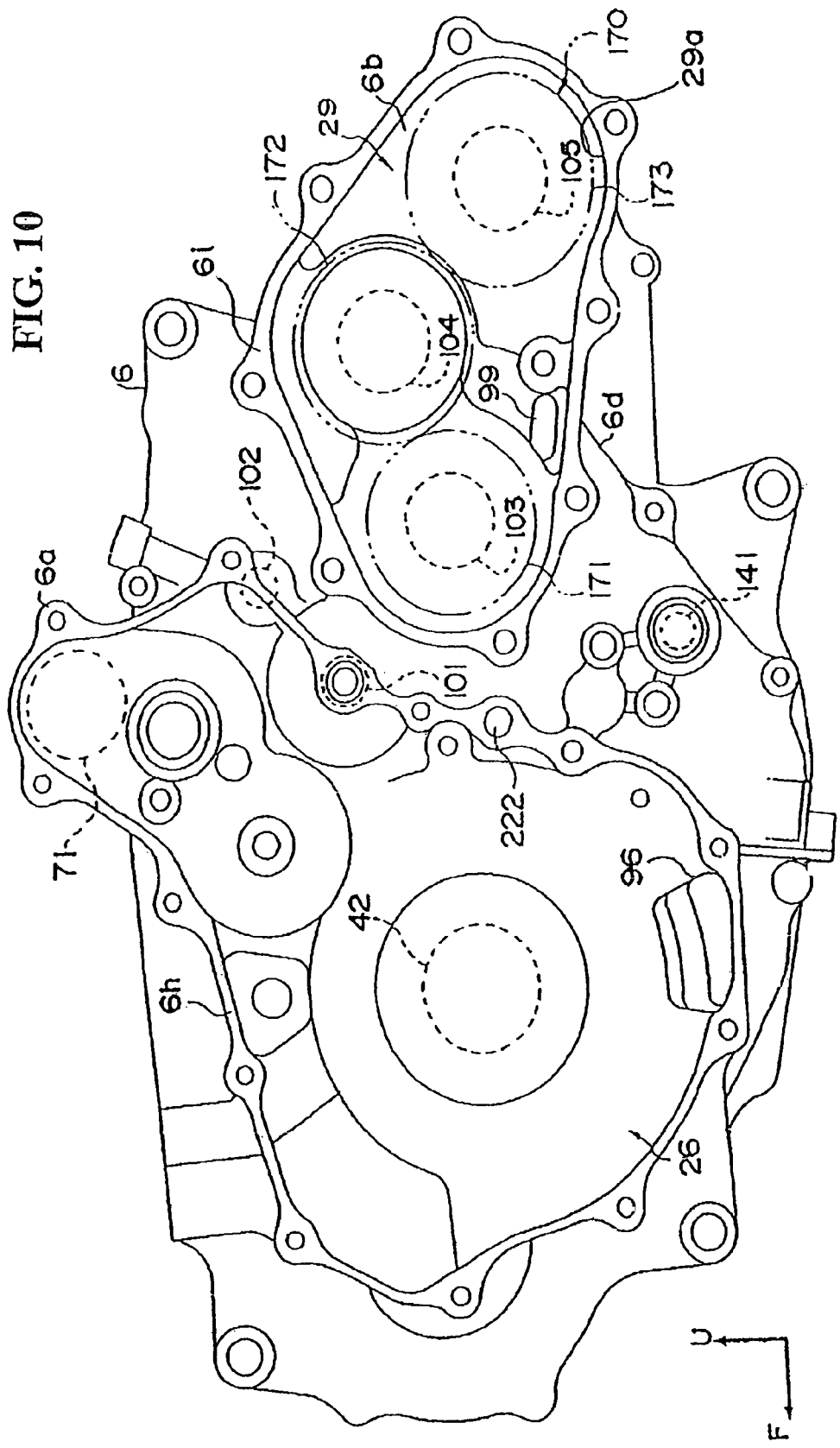
FIG. 10 is a left side view of the left case of the power unit of FIG. 1.

The right cover 9 is fastened to a cover attachment rib 5h formed to project from the right side face of the right case 5 as shown in FIG. 7. The left cover 10 is fastened to a cover attachment rib 6h formed to project from the front of the left side face of the left case 6 as shown in FIG. 10. The gear case 11 is fastened to the gear case attachment rib 61 formed to project from the rear of the left side face of the left case 6 as shown in FIG. 10.

A lubricating oil system of the power unit P is hereinafter described with reference to FIGS. 2 through 14. The lubricating oil system includes the oil strainer 85 (see FIGS. 6, 12 and 14), a feed pump 81 (see FIGS. 2 and 11), a scavenging pump 82 (see FIGS. 2, 11 and 14), and lubricating oil passages formed inside the housing H and shafts so as to lead lubricating oil. The strainer 85 is provided inside the oil storage chamber 35. The feed pump 81 feeds the lubricating oil stored in the oil storage chamber 35 to portions of the power unit P needed to be lubricated. The scavenging pump 82 sucks the lubricating oil stored in the oil storage chamber 35 via the strainer 85 and returns the lubricating oil to the oil storage chamber 35.

Referring to FIG. 2, each of the feed pump 81 and the scavenging pump 82 is a trochoid pump. A pump drive shaft 83 is adapted to drive both the pumps 81, 82 and rotors thereof housed in the right cover 5. The pump drive shaft 83 is threaded to the right end of the crankshaft 42 and rotated integrally with the crankshaft 42. The feed pump 81 is located on the right side of the scavenging pump 82. The pump cover 17 is attached to cover the rotor of the feed pump 81 at right side thereof. An intake port 81a of the feed pump 81 is formed inside the right cover 9. A discharge port 81b of the feed pump is formed inside the pump cover 17. The scavenging pump 82 has an intake port 82a and a discharge port 82b both formed inside the right cover 9.

Figure 12:
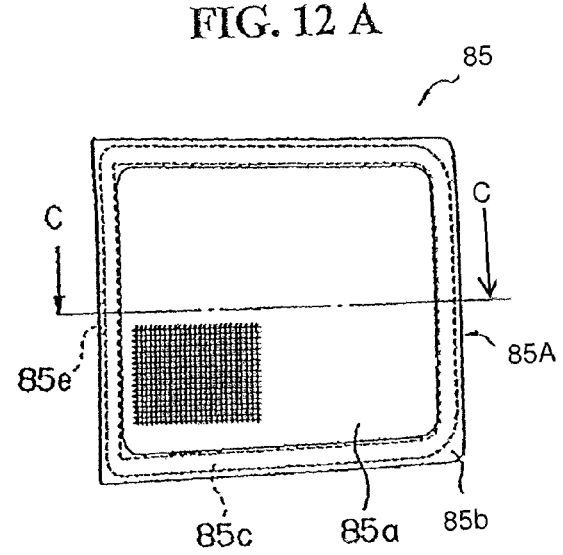
FIG. 12A is a bottom view of the strainer used in the power unit of FIG. 1.
FIG. 12B is a side view of the strainer of FIG. 12A.
FIG. 12C is a sectional view of the strainer taken along line C-C of FIG. 12A.
Figure 12:
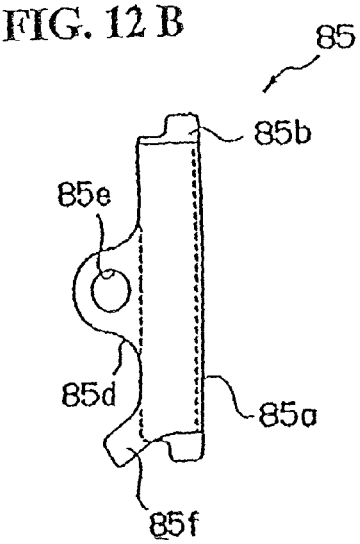
Figure 12:
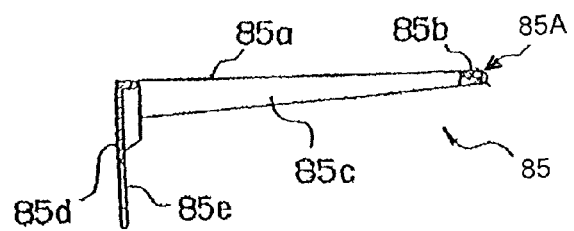

Referring to FIG. 12, the oil strainer 85 includes a substantially rectangular flat plate shaped strainer element 85a made of metal mesh, a core 85b made of a metal material and having an substantially rectangular frame adapted to hold the strainer element 85a, and a gasket 85c made of a rubber material and interposed between the core 85b and the strainer element 85a. The strainer element 85a and the core 85b may be made of any suitable material other than metal. Also, the gasket 85c may be made of any suitable sealing material.

The core 85b is formed integrally with a substantially flat plate shaped attachment bracket 85d (also referred as support bracket) which extends from one side of the rectangular frame of the core 85b in a substantially vertical direction holding the element 85a. The attachment bracket 85d includes a circular hole 85e formed therein at a position above the central portion of the attachment bracket 85d.

As shown in FIG. 12B, the core 85b is formed with a retaining portion 85f which has the same thickness as that of the attachment bracket 85d and which projects from an end portion of the attachment bracket 85d obliquely outwardly (in a direction opposite to the direction of holding the element 85a).

Referring to FIG. 6, a portion of the oil strainer 85, denoted with symbol 85A in FIGS. 12A and 12C, is first inserted from the right side into a strainer housing hole 5r formed above the lower wall portions 5f, 6f of the right case 5. Then, the oil strainer 85 is fitted into the strainer housing hole 5r while bringing the attachment bracket 85d extending vertically relative to the strainer element 85a into abutment against the upper wall portion 5s of the housing hole 5r. The upper wall surface 5s is formed with a bolt insertion hole 5t opening rightward outward of the right case 5. The oil strainer 85 is fastened to the right case 5 by a bolt threaded into the bolt insertion hole 5t via a circular hole 85e of the attachment bracket 85d. It may be noted that the portion of the strainer 85 is covered by the right cover 9.

With the oil strainer 85 fastened to the right case 5, the retaining portion 85f formed on the attachment bracket 85d projects upward from the upper wall portion 5s to face the shift change mechanism 140 and the reverse inhibitor mechanism 160. The retaining portion 85f and the right case 5 are designed to retain the one end portion 163b of the torsional coil spring 163 included in the reverse inhibitor mechanism 160. An elongate portion 163f is formed so as to bend from the one end portion 163b of the torsional coil spring 163 and extend linearly therefrom. As shown in FIG. 6, the linear portion 163d of the elongate portion 163f extends toward the lower forward of the inhibitor shaft 161 and comes into abutment at its tip against the left side face of the retaining portion 85f. A bent portion 163e of the elongate portion 163f is arranged to bend and extend from the abutment portion between the linear portion 163d and the retaining portion 85f toward the leftward and forward upside thereof.

FIG. 6 shows a state where the leading end of the inhibitor arm 162 is located inside the inhibitor groove 142d. When the shift change lever is operated to pivotally move the inhibitor arm 162 together with the inhibitor shaft 161 in the direction of arrow R2, the one end portion 163b of the torsional coil spring 163 is pivotally moved rearward upward. Even if the one end portion 163b is pivotally moved in this way, the one end 163d maintains a state where the bent portion 163e is constantly abutted against the side face of the retaining portion 85f. This is because the bent portion 163e is formed to extend from the abutment portion between the linear portion 163d and the retaining portion 85f toward the forward upside thereof before the pivotal movement. Thus, the coil portion 163a is compressed without axially moving on the inhibitor shaft 161.

Next, with reference to FIGS. 3 and 4, discussed below are the lubricating oil passages formed inside the main shaft 101, the reverse idle shaft 102 and the counter shaft 103 among the lubricating oil passages as well as of the supporting structures for the shafts 101, 102 and 103.

Referring to FIG. 3, the main shaft 101 is formed with an axial oil passage 101c axially passing through the axial central portion and with a plurality of radial oil passages 101d extending from the axial oil passage 101 radially outwardly. The left end 101b of the main shaft 101 is supported by a bearing 181 received in a receiving hole 6p formed in the right side face of the left case 6. In this case, the left end face of the main shaft 101 is formed almost flush with the left end face of the bearing 181. The receiving hole 6p is formed as a stepped circular cylinder and the diameter of the cylindrical hole is smaller as it goes leftward. Thus, in the state where the bearing 181 is received in the receiving hole 6p, an oil sump 219 communicating with the axial oil passage 101c is formed on the left side of the bearing 181 inside the receiving hole 6p. Referring to FIG. 4, the reverse idle shaft 102 is formed with an axial oil passage 102c axially passing through the axial central portion and with a radial oil passage 102j extending radially from the axial oil passage 102c. Further, the reverse idle shaft 102 is formed with a first and a second jet oil passages 102f, 102g which extend radially from the axial oil passage and have a diameter smaller than that of the radial oil passage 102j.

Figure 13:
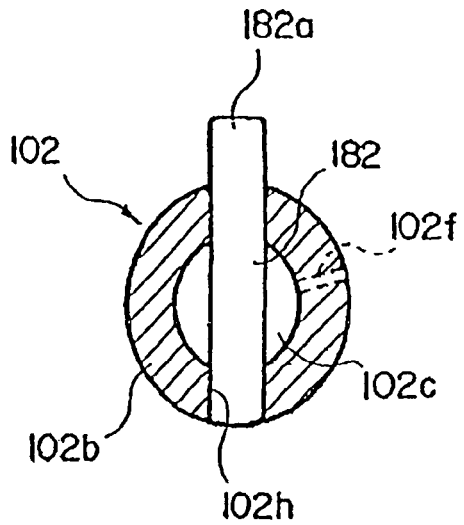
FIG. 13 is a sectional view of the reverse idle shaft taken along line XIV-XIV of FIG. 4 and viewed in the direction of the line arrows.

Referring to FIG. 13, the left end portion 102b of the reverse idle shaft 102 is formed with a through-hole 102h radially passing therethrough. A pin 182 is press fitted into the through hole 102h in such a manner that a tip portion 182a thereof projects from an opening of the through-hole 102h. Each of the through-hole 102h and the pin 182 is formed to have a sufficiently smaller diameter than that of the axial oil passage 102c.

The reverse idle shaft 102 has a right end 102a and a left end 102b. The right end is press fitted into a hole formed in the left side face of the right case 5 and a left end 102b is press fitted into a hole formed in the right side face of the left case 6. Thus, the axial oil passage 102c communicates via a right end opening 102d with an oil sump 227 formed inside the hole into which the right end 102a is press fitted. The axial oil passage also communicates, via left end opening 102b, with an oil sump 226 formed inside the hole into which the left end 102b is press fitted. The left case 6 includes a retaining groove 6q formed in right side face thereof (FIG. 3) extending radially outwardly from the hole into which the left end 102b of the reverse idle shaft 102 is press fitted. When the left end 102b of the reverse idle shaft 102 is press fitted into the left case 6, the tip portion 182a of the pin 182 is fitted into the retaining groove 6q.

In this way, the reverse idle shaft 102 is attached so as to be circumferentially positioned with respect to the transmission case 8. In addition, the first jet oil passage 102f faces the meshing portion of the fifth speed gear train G5, and the second jet oil passage 102g faces the meshing portion of the fourth speed gear train G4. The reverse idle gear shaft 102 is located above and between the main shaft 101 and the counter shaft 103 in the back and forth direction. Therefore, the respective openings of the first and the second jet oil passages 102f, 102g face the almost-downside, i.e., the openings of the oil passages 102f, 102g are oriented downwardly.

The through-hole 102h is subjected to cutting work to be accurately formed circular in cross-section while the pin is increased in dimensional accuracy. The pin 182 is press fitted into the through-hole 102h without backlash while the backlash between the pin 182 and the retaining groove 6q is reduced. Thus, the reverse idle shaft 102 can be accurately positioned circumferentially and also axially with respect to the transmission case 8. In addition, the openings of the first and second jet oil passages 102f, 102g can be oriented toward the respective targeted directions.

As shown in FIG. 3, the counter shaft 103 is formed at its axial central portion with an axial oil passage 103c which axially extends from the right end 103a and which is closed at its left-hand portion. A plurality of radial oil passages 103d (103f) are formed to radially extend from the axial oil passage 103c. It may be noted that a radial oil passage 103f located on the leftmost side opens inward of the final gear chamber 29 in the assembled, configured state as shown in FIG. 2. The radial oil passage 103f is also referred as 'the final gear chamber supply oil passage' in this disclosure.

The right end 103a of the counter shaft 103 is supported by a bearing 183 received in a receiving hole 5p (FIG. 8) formed in the right case 5. In this case, the right end of face of the counter shaft 103 is formed flush with the right end face of the bearing 183. The receiving hole 5p is formed as a stepped circular cylinder and the diameter of the cylindrical hole gradually becomes smaller as it goes rightward. Thus, in the state where the bearing 183 is received in the receiving hole Sp, an oil sump 229 is formed on the right side of the bearing 183 inside the receiving hole 5p so as to communicate with the axial oil passage 103c via a right end opening 103e.

As shown in FIG. 4, the fork shaft 146 is a stationary shaft having its respective ends press fitted into respective holes formed in the inside surface of the transmission case 8. In a state where a left end 146b of the fork shaft 146 is press fitted into a hole formed in the right side face of the left case 6, an oil sump 221 is formed inside the hole.

A description of lubricating oil passages formed inside the housing H of the power unit is provided below.

Figure 11:
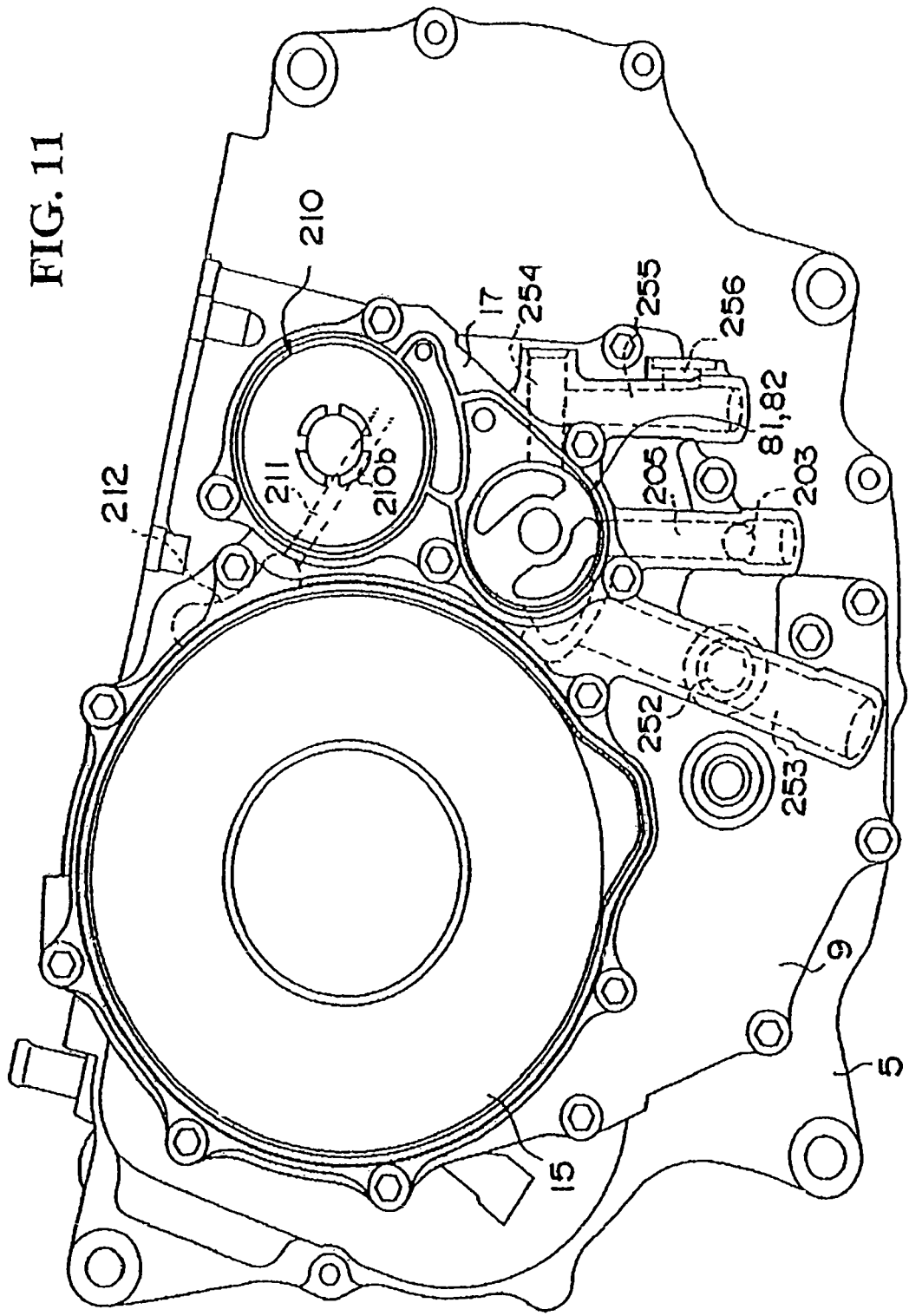
FIG. 11 is a right side view of the right case of the power unit of FIG. 1, fitted with a right cover, a clutch cover and a pump cover.

As shown in FIG. 7, an oil passage 201 is formed inside the right case 5 so as to extend from below and outward rearward portions thereof to inward forward portions of the cover attachment rib 5h. An oil passage 202 is formed to extend from the oil passage 201 to the rightward through the cover attachment rib 5h and opens in a mating face with the right cover 9. A line connected to the oil storage chamber 35 is connected to the outer opening of the oil passage 201. As shown in FIG. 11, the right cover 9 is formed with an oil passage 203 which extends leftward and rightward and opens in a mating face with the right case 5.

When the right cover 9 is joined to the right case 5, the respective openings of the oil passages 202, 203 are aligned with each other. The oil passage 203 communicates with an oil passage 205 which extends upward and downward inside the right cover 9. The oil passage 205 communicates at its upper end with an intake port 81a of the feed pump 81. The discharge port of the feed pump 81 communicates with an oil filter 210 via an inner oil passage of the pump cover 17. An output port 210b of the oil filter 210 communicates with an oil passage 211 extending inside the right cover 9. The oil passage 211 communicates, via front upper end portion thereof, with an oil passage 212 which further extends toward the front upside.

The oil passage 212 communicates, via front upper end portion thereof, with an oil passage 213 which extends inside the right case 5 leftward and rightward. The oil passage 213 communicates with a bolt insertion hole, which is formed in the circumferential edge of a fitting hole 4a, used to connect the cylinder block 3 with the crankcase 4. In addition, the oil passage 213 communicates with the front end of an oil passage 214 which extends backward and forward along the upper wall portion 5e inside the right case 5. The oil passage 214 communicates, via rear end portion thereof, with an oil passage 215 extending leftward and rightward.

As shown in FIG. 8, the oil passage 215 opens in a mating surface of the upper wall portion 5e with the left case 6. As shown in FIG. 9, an oil passage 216 is formed inside the left case 6 so as to extend leftward and rightward and open in a mating surface of the upper wall portion 6e with the right case 5. When the right case 5 and the left case 6 are joined together, the respective openings of the oil passages 215, 216 are aligned with each other as shown FIG. 4.

Referring to FIGS. 4 and 9, the oil passage 216 communicates with an oil passage 218 which extends toward the front downside in the left inside portion of the left case 6. The oil passage 218 communicates with the oil sump 226 formed inside the hole into which the left end portion 102b of the reverse idle shaft 102 is press fitted. In addition, the oil passage 218 further communicates with the oil sump 219 formed inside the receiving hole 6p adapted to receive the bearing 181 disposed therein which supports the left end portion 101b of the main shaft 101. An oil passage 220 is formed to extend from the oil sump 219 of the main shaft 101 along the extension of the oil passage 218. The oil passage 220 communicates, via front lower end portion thereof, with the oil sump 221 formed in the hole in which the left end portion 146b of the fork shaft 146 is press fitted.

Referring to FIGS. 4, 9 and 10, the oil sump 221 communicates with an oil passage 222 which extends leftward and rightward inside the cover attachment rib 6h of the left case 6 and opens in a mating surface with the left cover 10. Referring to FIG. 4, the left cover 10 is formed with an oil passage 223 which extends leftward and rightward and opens in a mating surface with the left cover 10. When the left case 6 and the left cover 10 are joined together, the respective openings of the oil passages 222, 223 are aligned with each other. As shown in FIGS. 2 and 4, the oil passage 223 communicates with an oil passage 225 which opens inside the left auxiliary machinery chamber 26.

With reference to FIGS. 3 and 4, the oil sump 219 communicates with the axial oil passage 101c of the main shaft 101. The right end opening of the axial oil passage 101c is closed. The oil sump 226 communicates with the axial oil passage 102c of the reverse idle shaft 102 via a left end opening 102e. The axial oil passage 102c communicates with the oil sump 227 formed in the hole into which the right end 102a of the reverse idle shaft 102 is press fitted through the right end opening 102d. As shown in FIGS. 3 and 7, the oil sump 227 communicates with an oil passage 228 extending rearward downward. The oil passage 228 communicates with the oil sump 229 formed inside the receiving hole 5p adapted to receive the bearing 183 supporting the right end 103a of the counter shaft 103. The oil sump 229 communicates with the axial oil passage 103c of the counter shaft 103 via the right end opening 103e.

Figure 14:
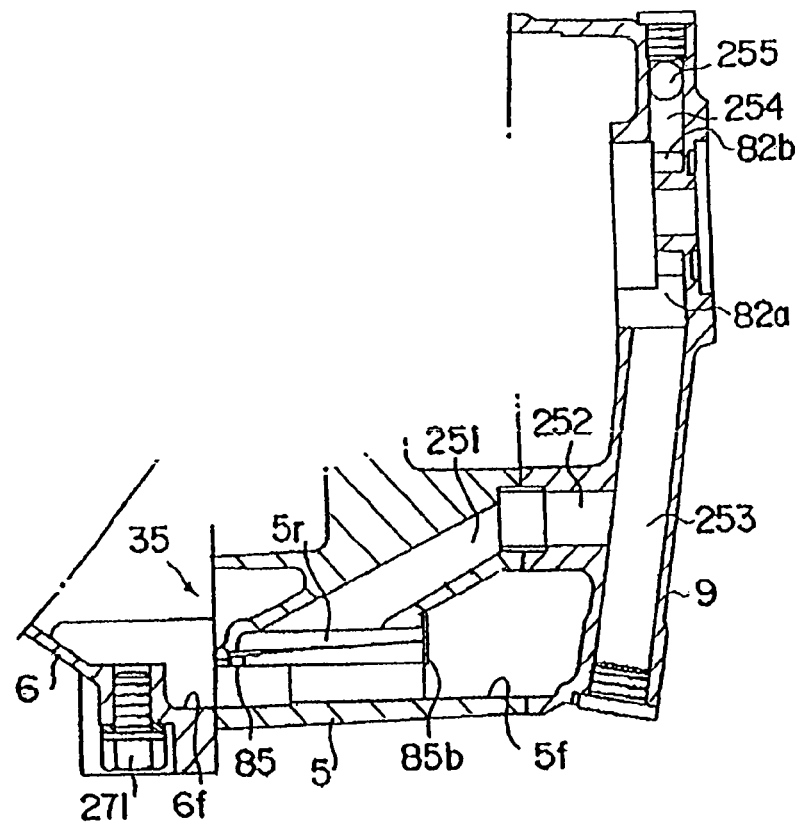
FIG. 14 is a sectional view of a portion of the power unit, showing oil passages connected to a scavenging pump.

Referring to FIGS. 6 and 14, an oil passage 251 is formed inside the right case 5 so as to extend rightward upward from the receiving hole 5r adapted to receive the oil strainer 85 therein. An oil passage 252 is formed inside the right cover 9 so as to extend rightward and leftward. When the right case 5 and the right cover 9 are joined together, the respective openings of the oil passages 251, 252 are aligned with each other. Referring to FIGS. 11 and 14, the oil passage 252 communicates with an oil passage 253 which extends upward and downward inside the right cover 9. The oil passage 253 communicates, via upper end portion thereof, with the intake port 82a of the scavenging pump 82. The discharge port 82b of the scavenging pump 82 communicates with an oil passage 254 which extends rearward inside the right cover 9. As shown in FIG. 11, an oil passage 255 is formed inside the right cover 9 so as to extend upward and downward in the rear portion, communicating with the oil passage 254. In addition, an oil passage 256 is formed inside the right cover 9 so as to extend rearward from the oil passage 255. The oil passage 256 is connected at its rear end opening to a line connected to the oil storage chamber 35.

As shown in FIG. 14, a drain bolt 271 is threaded into the lower wall portion 6f of the left case 6. The lubricating oil stored in the oil storage chamber 35 can be discharged from the oil storage chamber by simply removing the drain bolt 271.

In the power unit P having the lubricating oil passages as described herein above, when the engine E is started to rotate the crankshaft 42, the pump drive shaft 83 is rotated to drivingly rotate the rotors of each of the feed pump 81 and the scavenging pump 82. When the feed pump 81 is operated, the lubricating oil stored in the oil storage chamber 35 is allowed to flow in the oil passage 201, sucked into the intake port 81a of the feed pump 81, and discharged from the discharge port 81b. The lubricating oil discharged from the discharge port 81b is filtered with the oil filter 210 and fed from the inside of the right cover 9 to the inside of the right case 5 via the oil passage 212. The lubricating oil is further fed through the oil passages 215, 216 to the inside of the left case 6. The lubricating oil fed to the oil passage 218 is fed via the oil sump 226 to the axial oil passage 102c of the reverse idle shaft 102. The lubricating oil is further fed through the oil sump 219 to the axial oil passage 101c of the main shaft 101, and to the oil passage 220.

As shown in FIG. 3, the lubricating oil fed to the axial oil passage 102c of the reverse idle shaft 102 is fed through the radial oil passage 102j to the joining portion between the reverse idle gear 132 and the reverse idle shaft 102. In addition, as shown in FIG. 8, the lubricating oil fed to the axial oil passage 102c is sprayed through the first jet oil passage 102f on the meshing portion between the fifth speed drive gear 125 and the fifth speed driven gear 130. Similarly, the lubricating oil is sprayed through the second jet oil passage 102g on the meshing portion between the fourth speed drive gear 124 and the fourth speed driven gear 129. The lubricating oil thus fed to the joining portion and the meshing portions is discharged inside the transmission chamber 28.

The lubricating oil fed to the axial oil passage 102c of the reverse idle shaft 102 is fed through the oil sump 227. The lubricating oil also flows from the oil sump 227 to the oil passage 228 and then through the oil sump 229 to the axial oil passage 103c of the counter shaft 103. The lubricating oil fed to the axial oil passage 103c of the counter shaft 103 is fed through the radial oil passages 103d to the joining portion between the counter shaft 103 and each of the first speed driven gear 126, the reverse driven gear 133, the third speed driven gear 128, the third speed shift sleeve 138, the fifth speed driven gear 130 and the second speed driven gear 127. The lubricating oil thus fed to the joining portions is discharged inside the transmission chamber 28.

Referring to FIG. 2, the lubricating oil fed to the axial oil passage 103c of the counter shaft 103 is discharged inside the final gear chamber 29 through the final gear chamber supply oil passage 103f formed in the left end portion 103b.

Referring to FIG. 3, the lubricating oil fed to the axial oil passage 101c of the main shaft 101 is fed through the radial oil passages 101d to the joining portion between the main shaft 101 and each of the primary driven gear 112, the fourth speed drive gear 124, the fifth speed drive gear 125 and the first shift sleeve 136. The lubricating oil thus fed to the joining portions is discharged inside the transmission chamber 28.

As shown in FIGS. 2 and 4, the lubricating oil fed to the oil passage 220 is fed from the inside of the left case 6 to the inside of the left cover 10 and then discharged from an oil passage 225 into the left auxiliary machinery chamber 26. A portion of the lubricating oil discharged from the feed pump 81 is fed through a tube 84 to an oil passage 267 formed inside the crankshaft. The lubricating oil fed to the oil passage 267 is fed to the connecting portion between a connecting pin 42d and a connecting rod 44 and then discharged inside the crank chamber 24.

The lubricating oil discharged in the crank chamber 24 is returned to the oil storage chamber 35 via the communication space 4b located below the front lower portion of the crank chamber 24. At this time, the lubricating oil discharged in the crank chamber 24 is circumferentially scraped out by the rotating crank webs 42c, 42c. The central partition walls 5g and 6g are formed at the lower ends with oil collecting ribs 5j and 6j, respectively, which are designed to collect the lubricating oil scraped out and circumferentially splashed by the crank webs 42c, 42c. The lubricating oil thus collected is effectively returned to the oil storage chamber 35 via the communication space 4b.

Referring to FIGS. 9 and 10, the lubricating oil discharged in the left auxiliary machinery chamber 26 is returned to the oil storage chamber 35 via a communicating port 96. This communicating port 96 is formed at the side lower portion of the left case 6 so as to cause the lower portion of the left auxiliary machinery chamber 26 to communicate with the oil storage chamber 35. The lubricating oil discharged from the transmission chamber 28 intactly, unbrokenly flows downward, due to gravity, in the oil storage chamber 35 located therebelow.

The lubricating oil discharged in the final gear chamber 29 through the final gear chamber supply oil passage 103f is ejected and fed to the final drive gear 171 and the final idle gear 172. An internal rear lower portion 29a of the final gear chamber 29 is downwardly concave so as to extend along the outer profile of the final driven gear 173. A portion of the lubricating oil discharged in the final gear chamber 29 reaches the recession of the rear lower portion 29a and scraped up by the final driven gear 173, lubricating the final gear train 170.

Referring to FIGS. 9 and 10, the left case 6 is formed in the side rear portion of the power unit. The left case includes a communicating port 99 which allows the front-rear central lower portion (located below the final idle shaft 104) of the final gear chamber 29 to communicate with the rear portion of the transmission chamber 28. Most of the lubricating oil discharged in the final gear chamber 29 is naturally collected on the bottom of the final gear chamber 29 and then returned to the transmission chamber 28 via the communicating port 99. This communicating port 99 is located at a position close to the rear wall portion 6d of the left case 6, and the lower wall portion of the gear case attachment rib 61, and is adjacent to the bottom surface of the final gear chamber 29. The rear wall portion 6d of the left case 6 as well as the rear wall portion 5d of the right case 5 extends obliquely downwardly and forwardly toward the oil storage chamber 35. Thus, the lubricating oil discharged from the final gear chamber 29 through the communicating port 99 to the transmission chamber 28 runs along the rear wall portions 5d, 6d, flows downward inside the transmission chamber 28 and is fed to the oil storage chamber 35.

As described above, in the configuration of the embodiment, the reverse idle shaft 102 constituting part of the power transmission device M is formed with the axial passage 102c, and the first and the second jet oil passages 102f, 102g. Both the ends 102a, 102b of the reverse idle shaft 102 are supported by the half-split transmission case 8. The axial oil passage 102c is configured to communicate with the oil passages 218 and 228 (and the oil sumps 226 and 227) formed inside the right case 5 and the left case 6, respectively. The respective openings of the first and the second jet oil passages 102f, 102g are made to face the respective meshing portions of the forth and the fifth speed gear trains G4 and G5 among the forward stage setting gear trains provided between the main shaft 101 and the counter shaft 103.

Thus, the lubricating oil is sprayed from the reverse idle shaft 102 to the meshing portions of the gear trains constituting the power transmission device M, which makes it possible to effectively lubricate the speed change gear trains. The members forming the oil passages are adapted to lead lubricating oil from the inner oil passage of one of the case halves to the inner oil passage of the other of the case halves and, the members adapted to spray the lubricating oil to the speed change gear trains are not dedicated members but the shafts of the power transmission device M. Therefore, the power transmission device M and the lubricating device both of which have the above effects can be configured while reducing the number of component parts.

The pin 182 is attached to the end of the reverse idle shaft 102 in such a manner that its tip portion 182a projects radially outwardly. When the reverse idle shaft 102 is fastened to the transmission case 8, the tip portion 182a of the pin 182 is fitted into the retaining groove 6q formed in the inner surface of the transmission case 8. Thus, such a simple configuration can restrict the rotation of the reverse idle shaft 102. In addition, this fit can cause the reverse idle shaft 102 to be circumferentially positioned with respect to the transmission case 8. Thus, the openings of the first and second jet oil passages 102f, 102g can surely be oriented toward the respective targeted directions.

The left end opening 102e of the axial oil passage 102c of the reverse idle shaft 102 is configured to communicate with the oil passage 218 (and the oil sump 226) connected to the discharge port 81b of the feed pump 81. In addition, the right end opening 102d of the reverse idle shaft 102 is configured to communicate with the oil passage 228 (and the oil sump 227) connected to the right end opening 103e of the axial oil passage 103c of the counter shaft 103. Thus, the axial oil passage 102c of the reverse idle shaft 102 is located on the upstream side whereas the axial oil passage 103c of the counter shaft 103 is located on the downstream side, as shown in FIG. 3. Such configuration permits spraying of higher pressurized lubricating oil on the meshing portions of the speed change gear trains. In addition, the lubricating oil reduced in pressure resulting from the jet spray is fed to the gears or other parts of the engine provided on the counter shaft 103. In this way, the lubricating oil can be effectively fed to various parts of the engine according to the hydraulic pressure of the lubricating oil.

As shown in FIG. 8, the reverse idle shaft 102 extending rightward and leftward is disposed above and between the main shaft 101 and the counter shaft 103 in the back and forth, longitudinal direction. The meshing portions of the first through fifth speed gear trains G1 through G5 for establishing the forward stages of the speed change gear trains are located below the reverse idle shaft 102. Thus, the first and the second jet oil passages 102f, 102g extend substantially downwardly from the axial oil passage 102c. With such arrangement of the shafts, the lubricating oil can be easily and effectively sprayed downward, thereby effectively lubricating the speed change gear trains.

The counter shaft 103 and the output shaft 105 are juxtaposed in the back and forth, longitudinal direction and the final idle shaft 104 is located above and between the counter shaft 103 and the output shaft 105 in the longitudinal direction. In the embodiment, the counter shaft 103 and the output shaft 105 are located at respective positions higher than the crankshaft 42. The oil storage chamber 35 is formed to be located below the crank chamber 24 housing the crankshaft 42. Thus, a difference in height between the communicating port 99 allowing the final gear chamber 29 to communicate with the transmission chamber 28 and the oil storage chamber 35 is increased. This increased difference in height enables the lubricating oil discharged in the final gear chamber 29 to be quickly discharged toward the oil storage chamber 35. In addition, the increased difference also reduces the possibility that the lubricating oil will be returned from the oil storage chamber 35 toward the final gear chamber 29. This reduces the amount of lubricating oil getting collected in the final gear chamber 29, which reduces the stirring resistance of the final gear trains 170. Since the amount of the lubricating oil in the oil storage chamber 35 is stable, a disadvantage is eliminated that the feed pump 81 produces air lock. Since the communicating port 99 is provided at a back-and-forth central portion of the final gear chamber 29, the elevational position of the communicating port 99 is stable with respect to the level of the lubricating oil. Even if the level of the lubricating oil in the final gear chamber 29 is tilted in the back-and-forth direction due to traveling of the vehicle on a slope or undulated ground, therefore, it is easy to discharge the lubricating oil from the communicating port 99.

The lubricating oil discharged in the final gear chamber 29 is naturally collected on the bottom portion thereof at least up to a height of the communicating port 99 without being discharged therefrom. In this embodiment, since the communicating port 99 is adjacent to the lower wall portion of the gear case attachment rib 61, the minimum amount, per se, of lubricating oil collecting in the final gear chamber 29 can be reduced, which helps in stabilizing and substantially maintaining the amount of the lubricating oil in the oil storage chamber 35.

The communicating port 99 is formed adjacent to the inner surface, of the rear wall portion 6d of the left case 6, which extends forwardly slantly from the transmission chamber 28 toward the oil storage chamber 35 below the transmission chamber 28. The lubricating oil discharged through the communicating hole 99 to the transmission chamber 28 can be therefore returned to the oil storage chamber 35 while running along the inner surface of the rear wall portion 6d. Thus, even if the increased difference in height between the communicating port 99 and the oil storage chamber 35 is ensured, the lubricating oil discharged in the transmission chamber 28 will not directly drop in the oil storage chamber 35 to otherwise foam the lubricating oil stored in the oil storage chamber 35. This can reduce the possibility that the feed pump 81 produces air lock due to foamed lubricating oil.

When the gear case 11 is removed, the respective right ends of the counter shaft 103, the final idle shaft 104 and the output shaft 105 appear while being intactly retained on the side of the left case 6. The final gear train 170 together with the communicating port 99 is exposed to the left side of the vehicle. Thus, the final gear train 170 can be easily removed and replaced. Therefore, maintenance of the final gear train 170 and customization such as the change of the reduction ratio of the power transmission device M can be performed easily. In addition, the maintenance of the peripherals of the communicating port 99 can be performed easily.

The oil strainer 85 is fitted into and attached to the receiving groove 5r formed in the right case 5 and then fastened to the right case 5. This prevents the oil strainer 85 from dropping easily. The receiving groove facilitates easier attachment of the strainer 85 thereto. The one end portion 163b of the torsional coil spring 163 constituting part of the reverse inhibitor mechanism 160 is retained by the retaining portion 85f formed integrally with the attachment bracket 85d of the strainer 85. In this way, since the oil strainer 85 is reliably fastened, also the torsional coil spring 163 is reliably fastened. In addition, it is not necessary to otherwise form a rib or groove in the inner surface of the housing H to retain the torsional coil spring as in a conventional way, which can enhance the productivity of the housing H. Therefore, the present invention provides enhanced productivity for assembling the power units.

The one end portion 163b of the torsional coil spring 163 is formed to include the linear portion 163d extending from the coil portion 163a and the bent portion 163e which bends at the tip of the linear portion 163d. Even if the retaining portion 85f of the attachment bracket 85d is formed in a shape of a flat plate, the one end portion 163b of the torsional coil spring 163 is brought into constant abutment against the retaining portion 85f, and such abutment it can be easily maintained. Thus, the assembly work of the attachment bracket 85d is simplified to enhance the productivity of the oil strainer 85. Further, the retaining portion 85f is formed to project from the element 85a. Therefore, the bent portion 163e of the torsional coil spring 163 (and similar spring) can be attached without interference from the oil strainer 85 and other elements of the power unit, resulting into smooth operation of the reverse inhibitor mechanism 160.

In order to reduce the size of the reverse inhibitor mechanism 160 configured by retaining the torsional coil spring 163 at the oil strainer 85, it is necessary to bring the constituent members of the shift change mechanism 140 including the shift drum 142 close to the vicinity of the oil storage chamber 35. The shift change mechanism 140 is a mechanism for changing the setting of the speed change stage and does not form the power transmission path. Thus, the arrangement of the shift change mechanism 140 close to the oil storage chamber 35 does not affect efficiency of the power transmission. Therefore, the reverse inhibitor mechanism 160 may be reduced in size.

The oil strainer 85 is inserted for attachment from the right side into the receiving hole formed in the right case 5 and fastened to the right case 5 via a bolt inserted into the bolt insertion hole 5t opening in the right side face of the right case 5. The oil strainer 85 in the assembled state is covered by the right cover 9. The oil strainer 85 can be easily removed and replaced with another only by removing the right cover 9, thereby facilitating easy maintenance of the strainer 85.

While a working example of the present invention has been described above, the present invention is not limited to the working example described above, but various design alterations may be carried out without departing from the present invention as set forth in the claims.

What is claimed is:

1. A power unit comprising
    a crankcase formed at a lower portion of the power unit; said crankcase having an oil storage portion for collecting lubricating oil therein;
    an oil strainer provided in the oil storage portion; said oil strainer having a substantially flat plate shaped strainer element, and a strainer support bracket which extends substantially perpendicularly from the strainer element;
    a shaft member rotatably supported by the crankcase; and
    a biasing torsional coil spring disposed at one end of the shaft member with respect to a rotational axial direction of the shaft member;
    wherein the oil strainer is fixed to the crankcase through the strainer support bracket extending vertically relative to the strainer element, and
    wherein the torsional coil spring includes a coil portion wound around the shaft member, one end portion of the coil spring is retained on said one end of the shaft member, and the other end of the coil spring is retained by a retaining portion integrally formed with the strainer support bracket.

2. The power unit according to claim 1, further comprising a turn-restricting mechanism which restricts rotation of a turning member disposed above the oil strainer;
    wherein the turning member includes
        a groove portion extending in a circumferential direction formed in an outer circumferential surface of the turning member; and
        a stopper portion projecting radially outwardly with respect to the turning member in the groove portion; the stopper portion formed within the groove portion, and
    wherein the turn-restricting mechanism includes
        the shaft member,
        the torsional coil spring, and
        a swing arm attached to the shaft member so as to rotate simultaneously therewith, wherein rotation of the turning member is restricted by abutting a leading end of the swing arm against the stopper portion when the turning member is rotated.

3. The power unit according to claim 1, wherein the retaining portion comprises a substantially flat plate, and the other end portion of the torsional coil spring is disposed along the flat plate; and wherein the said other end portion of the torsional coil spring is bent and linearly extends along the retaining portion.

4. The power unit according to claim 2, wherein the retaining portion comprises a substantially flat plate, and the other end portion of the torsional coil spring is disposed along the flat shaped plate; and wherein the said other end portion of the torsional coil spring is bent and linearly extends along the retaining portion.

5. The power unit according to claim 2, wherein the power unit includes a power transmission device having a speed change mechanism which establishes a plurality of forward stages and a reverse stage;
    wherein the speed change mechanism includes the turning member housed inside the crankcase, said turning member is operable to establish a speed change stage in response to a rotational position thereof; and
    wherein the turn-restricting mechanism is configured to restrict rotation of the turning member to restrict establishment of a predetermined speed change stage when the leading end of the swing arm is located inside the groove portion of the shift drum.

6. The power unit according to claim 3, wherein the power unit includes
    a power transmission device having a speed change mechanism which establishes a plurality of forward stages and a reverse stage; and
    a turn-restricting mechanism comprising a swing arm attached to the shaft member and simultaneously rotatable with the shaft member;
    wherein the speed change mechanism includes a shift drum housed inside the crankcase; said shift drum is operable to establish a speed change stage in response to a rotational position thereof; and
    wherein the shift drum is operable to restrict establishment of a predetermined speed change stage when the leading end of the swing arm is located inside a groove portion of the shift drum.

7. The power unit according to claim 1, further comprising a cover member which covers an outer surface of the crankcase;
    wherein the strainer support bracket is fixed to the outer surface of the crankcase; and
    the strainer support bracket is covered by the cover member.

8. The power unit according to claim 2, wherein a cover member is attached to cover an outer surface of the crankcase and the strainer support bracket is fixed to the outer surface of the crankcase and covered by the cover member.

9. The power unit according to claim 3, wherein a cover member is attached to cover an outer surface of the crankcase and the strainer support bracket is fixed to the outer surface of the crankcase and covered by the cover member.

10. The power unit according to claim 4, wherein a cover member is attached to cover an outer surface of the crankcase and the strainer support bracket is fixed to the outer surface of the crankcase and covered by the cover member.

11. A power unit for a saddle type vehicle, said power unit comprising:
    a shaft member rotatably supported by a crankcase having an oil storage portion;
    a torsional coil spring disposed at one side of a rotational axial direction of the shaft member;
    an oil strainer disposed in the oil storage portion;
    said oil strainer comprising a strainer element and a strainer support bracket extending normally relative to the strainer element; said strainer bracket having a retaining portion;
    wherein the oil strainer is fixedly attached to the crankcase via the strainer support bracket; and
    wherein
    the torsional coil spring includes a coil portion wound around the shaft member;
    one end portion of the coil spring is retained on said one side of the shaft member; and
    the other end of the coil spring is retained by the retaining portion of the strainer support bracket.

12. A power unit according to claim 11, wherein the strainer element is formed in a shape of a flat plate.

13. A power unit according to claim 11, further comprising a shift drum and a turn-restricting mechanism having a swing arm attached to the shaft member, wherein
    the shift drum includes
    a groove portion extending in a circumferential direction formed in an outer circumferential surface thereof; and a stopper portion formed in the groove portion and projecting radially outwardly of the turning member;
wherein
the swing arm is operable to rotate simultaneously with the shaft member; and
the rotation of the shift drum is restricted by abutting a leading end of the swing arm against the stopper portion when the shift drum is rotated.

14. A power unit according to claim 11, wherein the retaining portion comprises a substantially flat plate, and the other end portion of the torsional coil spring is disposed along the flat plate; and wherein the said other end portion of the torsional coil spring is bent and linearly extends along the retaining portion.

* * * * *